(12) United States Patent
Ghofranian et al.

(10) Patent No.: US 10,687,638 B1
(45) Date of Patent: Jun. 23, 2020

(54) SYSTEM AND METHOD FOR HANGING A FRAME OR OBJECT ON A WALL WITHOUT TAKING MEASUREMENTS

(71) Applicants: Bijan Ghofranian, Laguna Niguel, CA (US); Shauna Ghofranian, Laguna Niguel, CA (US); Nushaw Ghofranian, Laguna Niguel, CA (US)

(72) Inventors: Bijan Ghofranian, Laguna Niguel, CA (US); Shauna Ghofranian, Laguna Niguel, CA (US); Nushaw Ghofranian, Laguna Niguel, CA (US)

( * ) Notice: Subject to any disclaimer, the term of this patent is extended or adjusted under 35 U.S.C. 154(b) by 0 days.

(21) Appl. No.: 15/940,805

(22) Filed: Mar. 29, 2018

Related U.S. Application Data

(60) Provisional application No. 62/478,214, filed on Mar. 29, 2017, provisional application No. 62/503,161, filed on May 8, 2017.

(51) Int. Cl.
*A47G 1/17* (2006.01)
*A47G 1/20* (2006.01)
*A47G 1/16* (2006.01)

(52) U.S. Cl.
CPC .............. *A47G 1/17* (2013.01); *A47G 1/205* (2013.01); *A47G 1/1606* (2013.01)

(58) Field of Classification Search
CPC ......... A47G 1/17; A47G 1/205; A47G 1/1606
USPC ................. 248/466, 467, 475.1, 480; 33/613
See application file for complete search history.

(56) References Cited

U.S. PATENT DOCUMENTS

| | | | |
|---|---|---|---|
| 2,681,194 A | 6/1954 | Halvorsen | |
| 3,330,525 A | 7/1967 | Weinstein | |
| 3,516,165 A | 6/1970 | Pfeffer | |
| 3,530,591 A | 9/1970 | Moffitt | |
| 4,220,309 A * | 9/1980 | Eisen | A47G 1/205 |
| | | | 248/467 |
| 4,228,982 A | 10/1980 | Sellera | |
| 4,241,510 A | 12/1980 | Radecki | |
| 4,437,639 A | 3/1984 | Stein | |
| 4,443,949 A | 4/1984 | Newton | |
| 4,457,485 A | 7/1984 | Landt | |
| 4,893,776 A | 1/1990 | Floyd | |
| 5,069,411 A | 12/1991 | Murphy | |
| 5,180,135 A | 1/1993 | Hindall | |
| 5,867,917 A | 2/1999 | Karon | |

(Continued)

FOREIGN PATENT DOCUMENTS

DE      202016105542 U1 * 12/2016 ............... A47K 5/02

*Primary Examiner* — Muhammad Ijaz
(74) *Attorney, Agent, or Firm* — Michael D. Eisenberg

(57) ABSTRACT

A system for hanging an object (e.g., picture frame) at a desired location on a wall without measurements includes planar marking strips, each with an elongate body attached to a proximal head. The marking strips are removably attached to a mounting surface of the object so that the proximal head protrudes from an edge of the object and the elongate body aligns with a mounting hook, recess or opening on the mounting surface of the object. Once the desired mounting location of the object on the wall surface is determined, the user presses the proximal head of the marking strip against the wall surface and withdraws the object relative to the marking strip, leaving the marking strips attached to the wall surface. The distal end of the elongate body indicates the location for insertion of a fastener to mount the object at the desired mounting location.

14 Claims, 20 Drawing Sheets

(56) References Cited

U.S. PATENT DOCUMENTS

| | | | |
|---|---|---|---|
| 6,029,362 A | | 2/2000 | Miodragovic |
| 6,032,378 A | | 3/2000 | Null |
| 6,952,887 B2 | | 10/2005 | Muchnik |
| 6,978,551 B2 | | 12/2005 | Krake et al. |
| 7,226,032 B2 | | 6/2007 | Schlais et al. |
| 7,350,312 B1 | | 4/2008 | Grillo |
| 7,802,769 B1 | * | 9/2010 | Lindsey ................ A47G 1/205 248/475.1 |
| 7,814,675 B2 | | 10/2010 | Venderley et al. |
| 8,864,095 B1 | * | 10/2014 | Marks ..................... A47G 1/16 248/323 |
| 9,578,980 B1 | * | 2/2017 | Freeman ................ A47G 1/205 |
| 2002/0078583 A1 | * | 6/2002 | Richardson ............ A47G 1/205 33/613 |
| 2003/0051363 A1 | * | 3/2003 | Hofmeister ............ A47G 1/205 33/613 |
| 2005/0218287 A1 | * | 10/2005 | Strobel ................. A47G 1/205 248/476 |
| 2007/0023605 A1 | * | 2/2007 | Schlais ................. A47G 1/205 248/489 |
| 2008/0196262 A1 | * | 8/2008 | Bommarito ............ A47G 1/205 33/613 |
| 2008/0271330 A1 | * | 11/2008 | Bender ................. A47G 1/205 33/365 |
| 2009/0045315 A1 | * | 2/2009 | Harralson ............. A47G 1/205 248/476 |
| 2009/0313843 A1 | * | 12/2009 | Compton ............... A47G 1/205 33/613 |
| 2017/0027341 A1 | | 2/2017 | Frazier, Jr. |
| 2017/0089511 A1 | | 3/2017 | Zhang et al. |
| 2017/0095094 A1 | | 4/2017 | Parrillo |
| 2017/0143139 A1 | * | 5/2017 | Fattahi .................. F16M 13/02 |
| 2018/0178364 A1 | * | 6/2018 | Bruno .................... B25C 3/008 |

\* cited by examiner

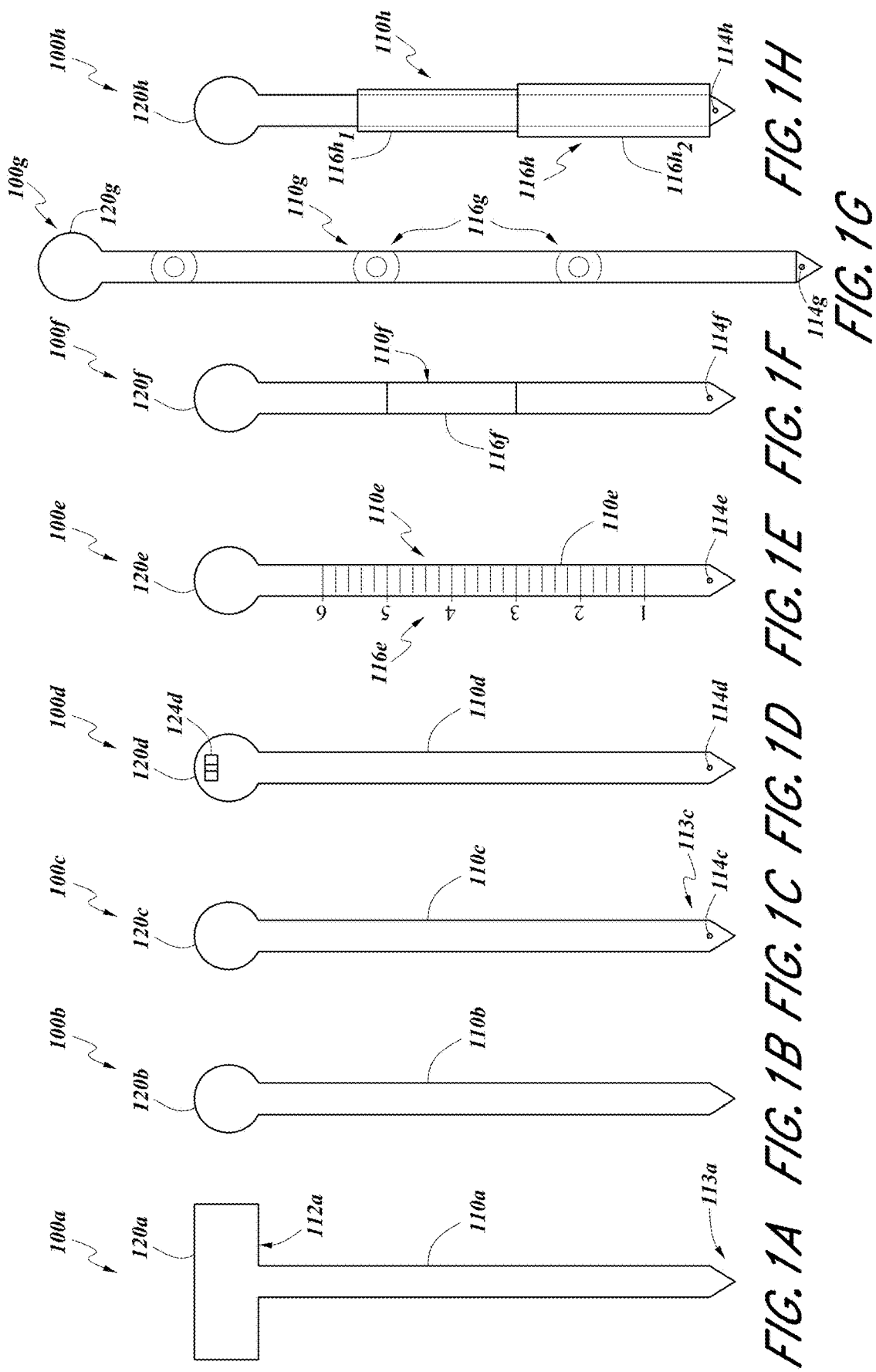

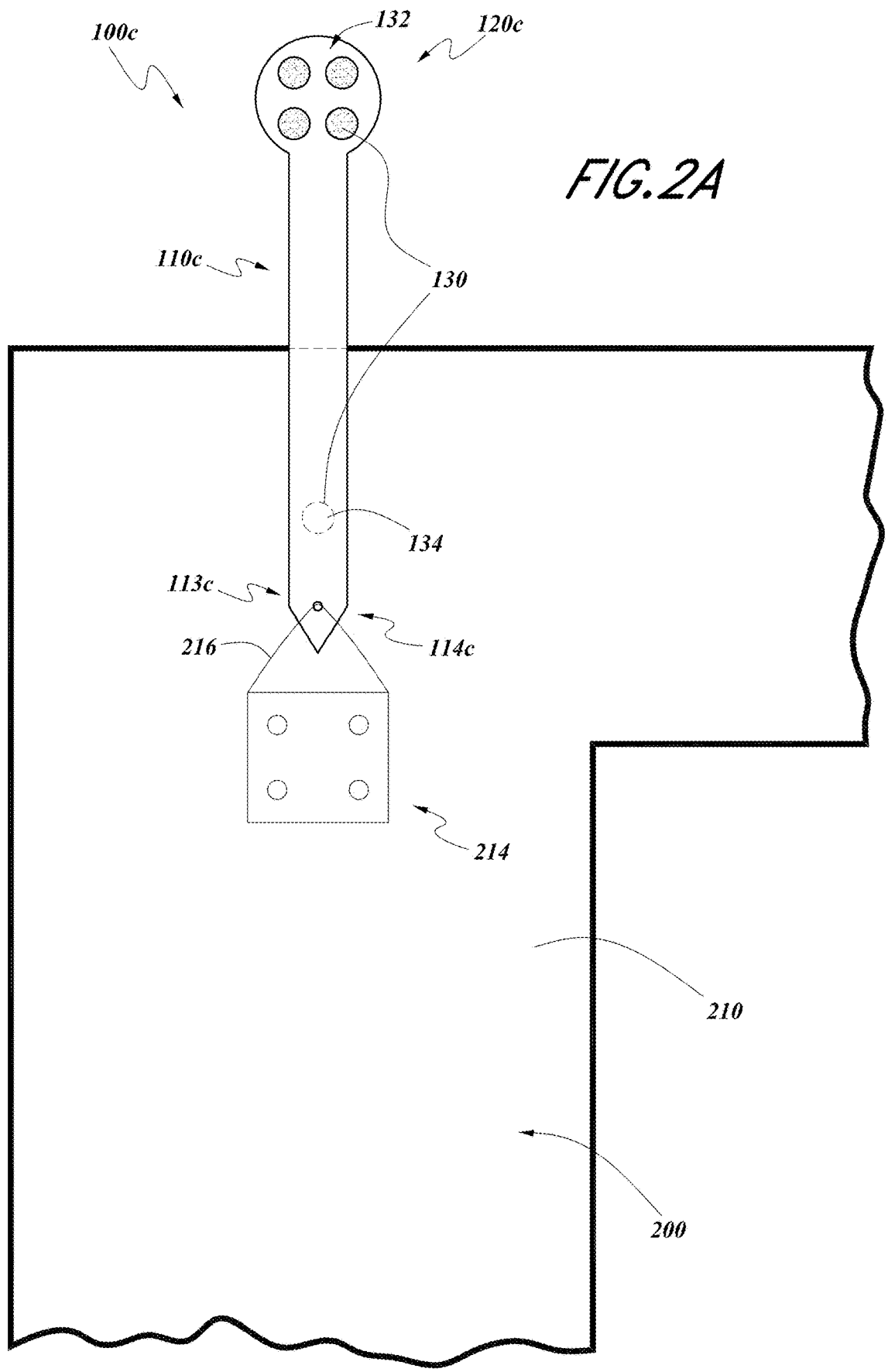

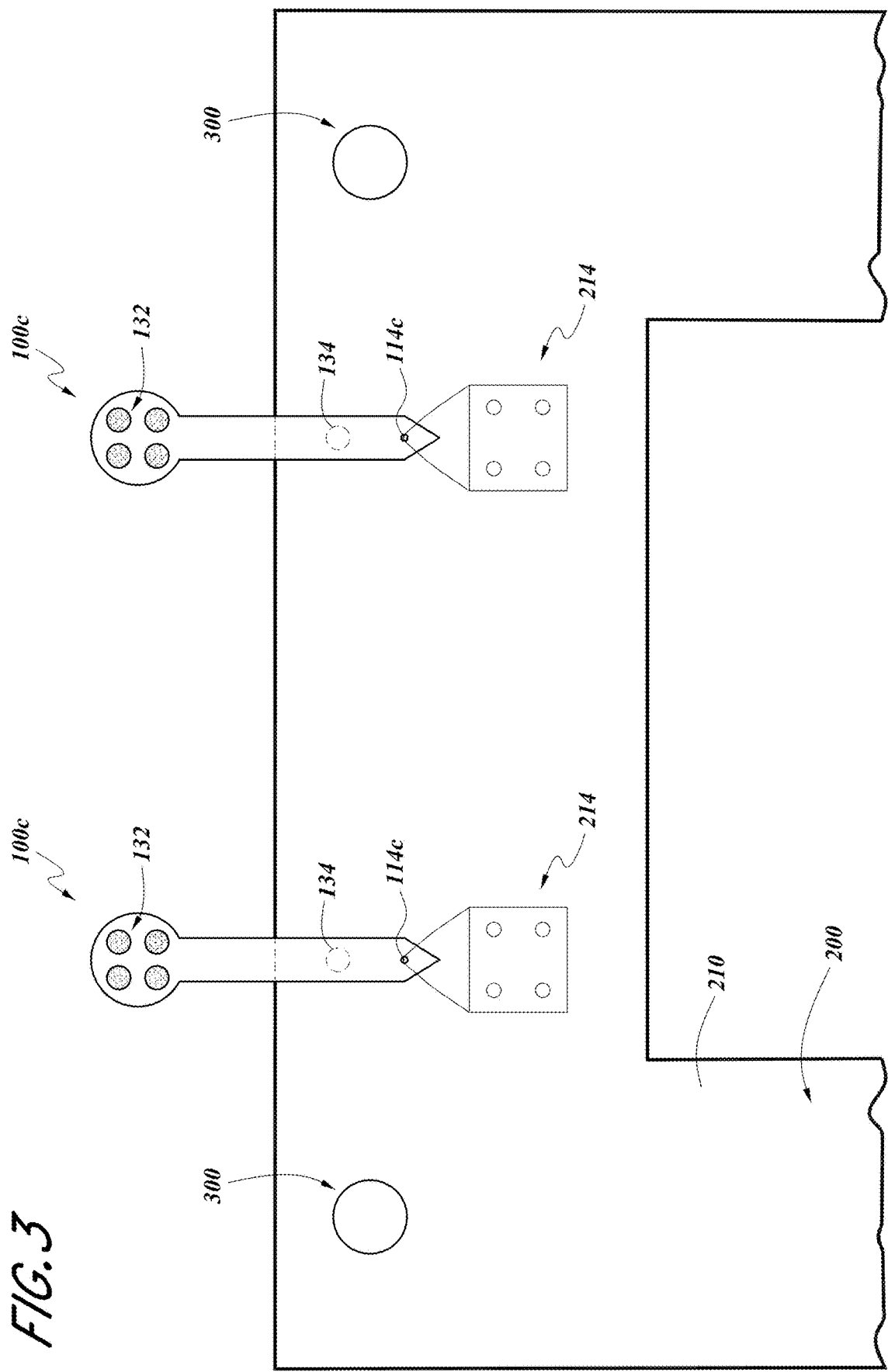

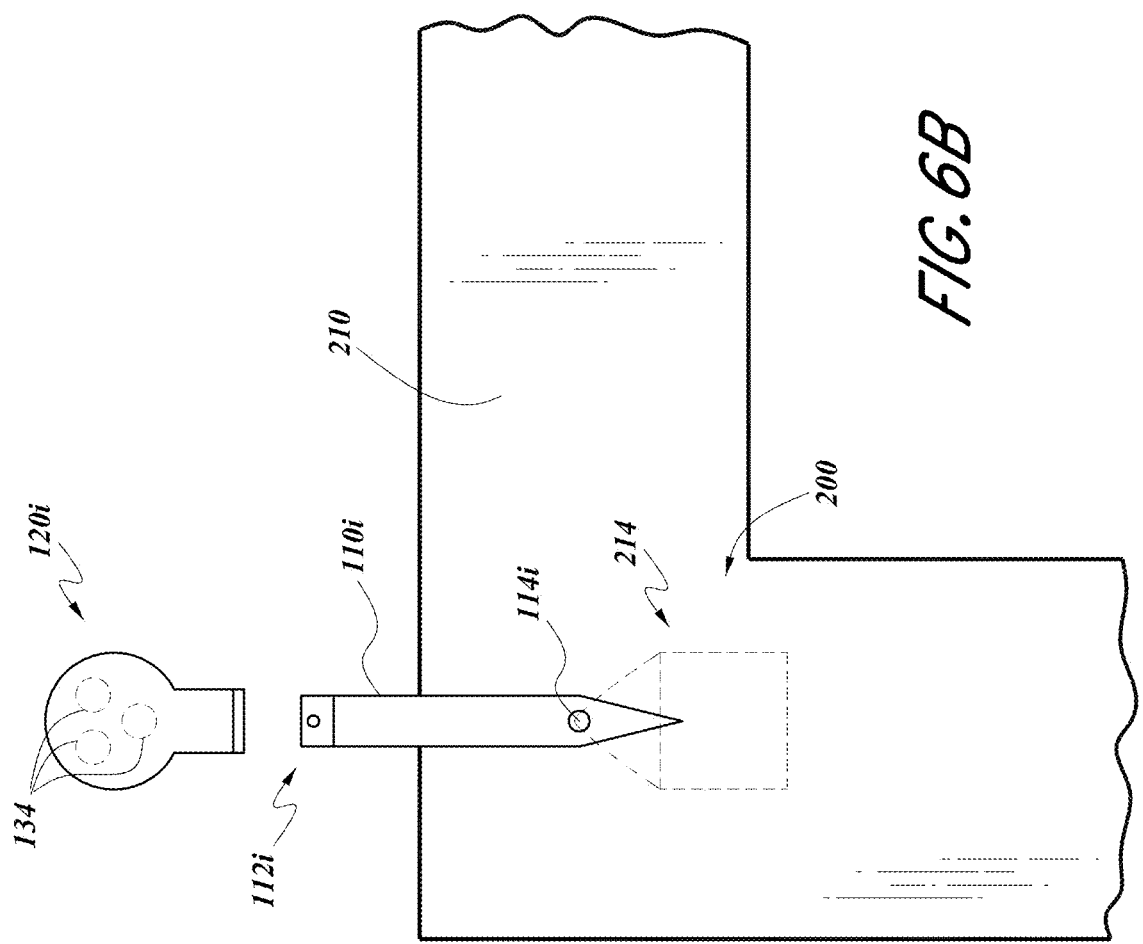
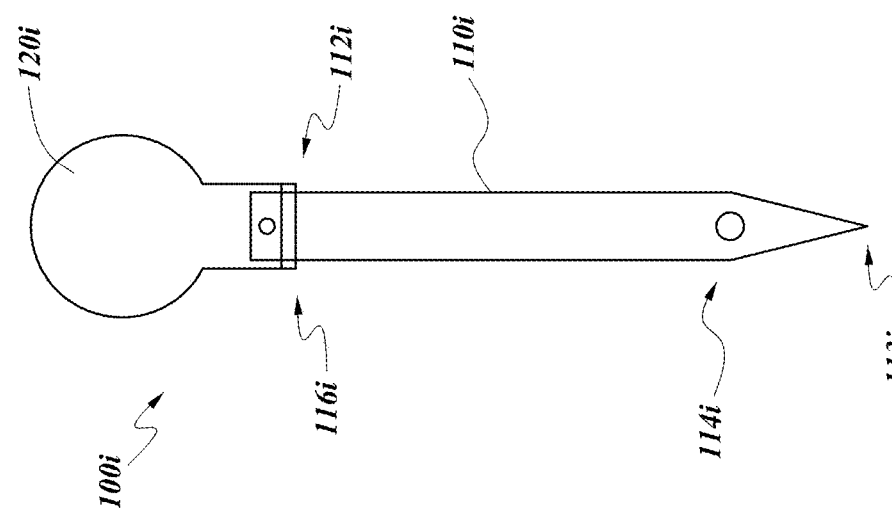

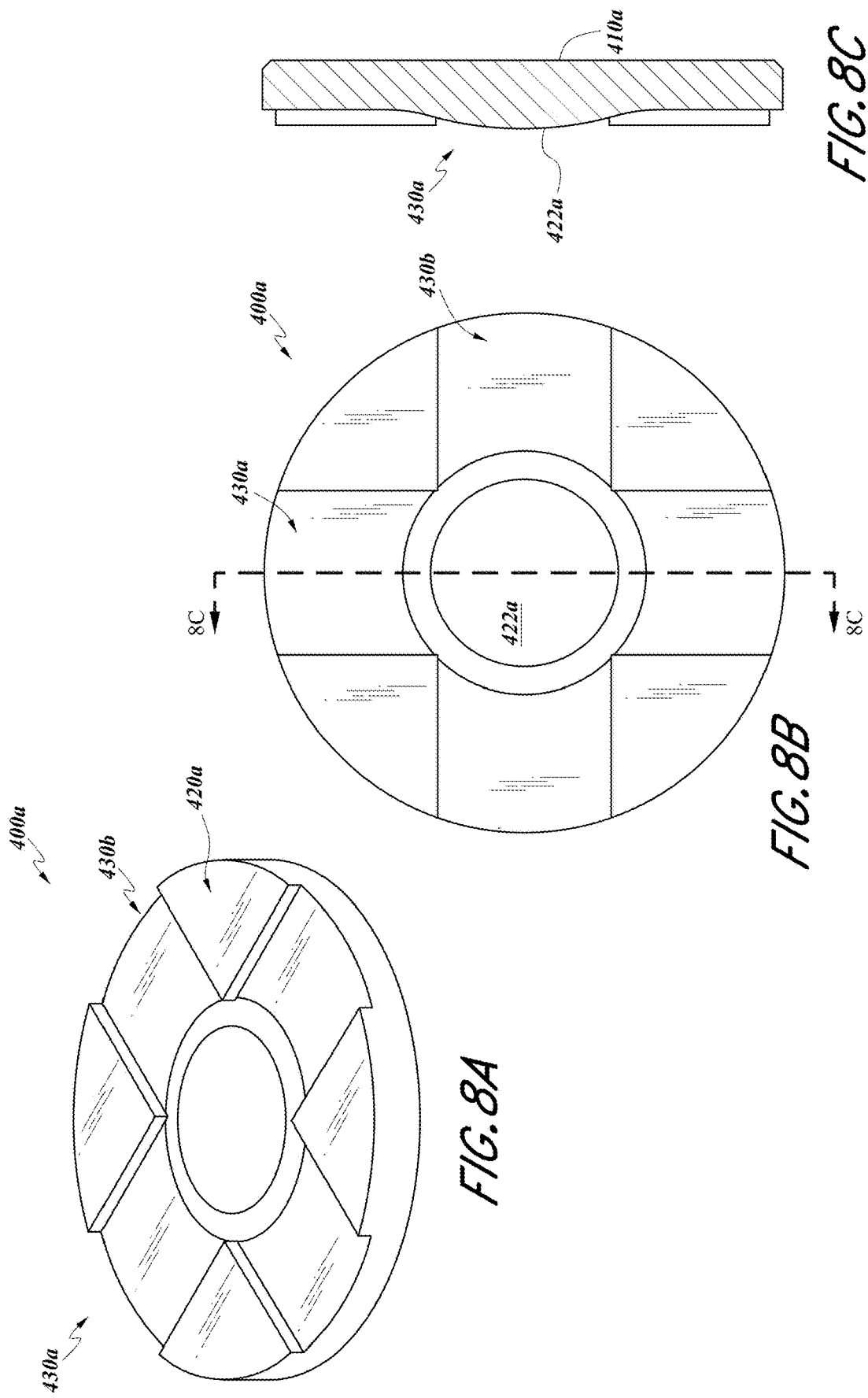

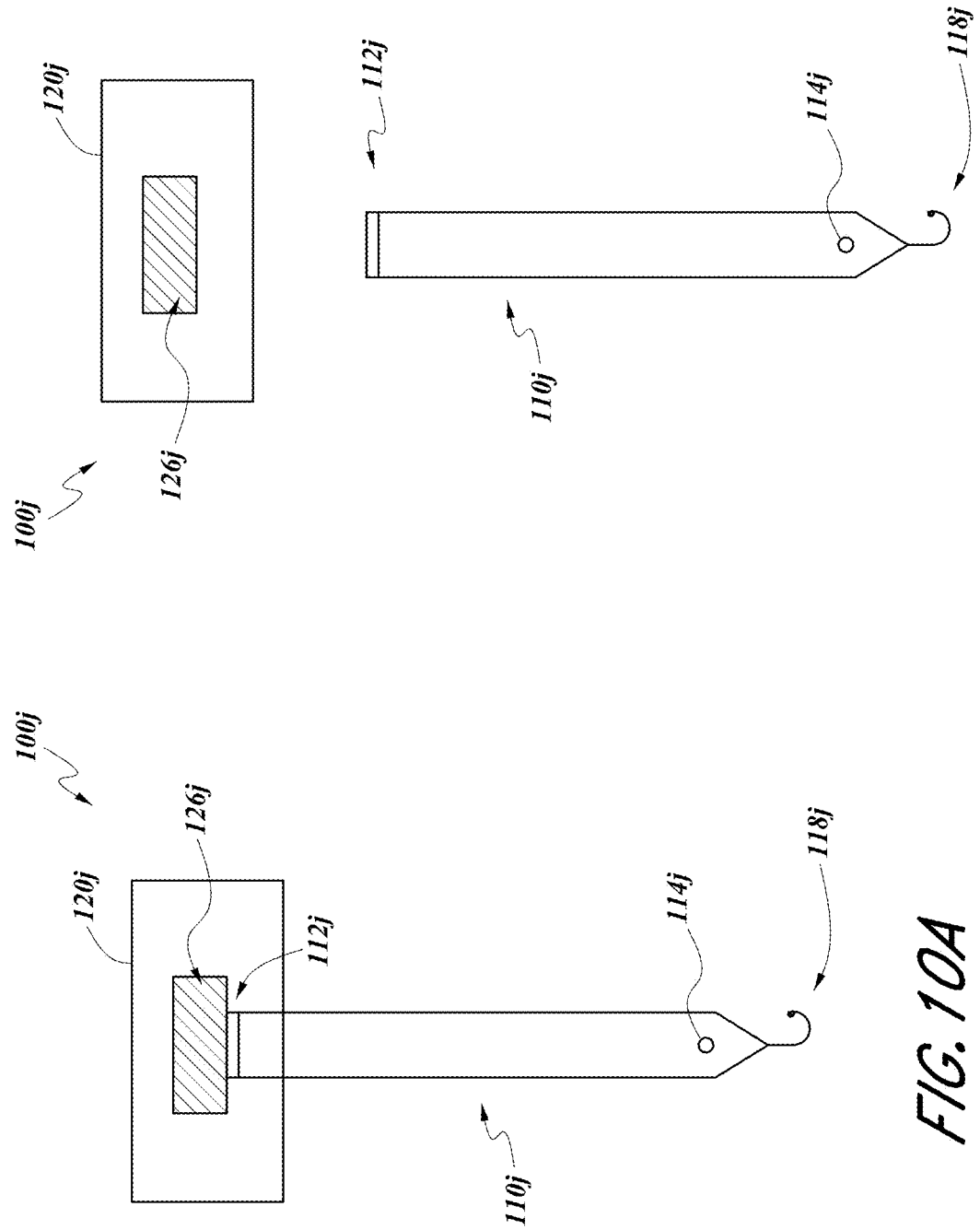

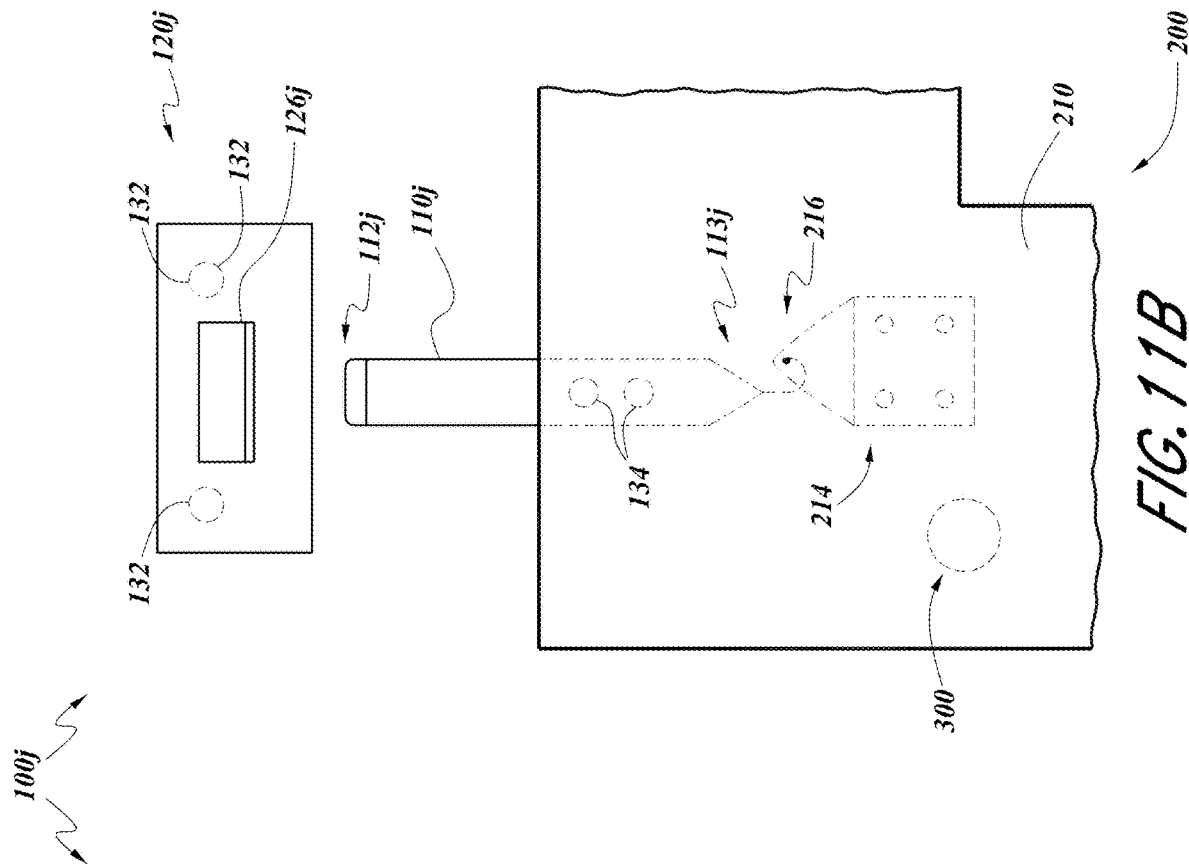
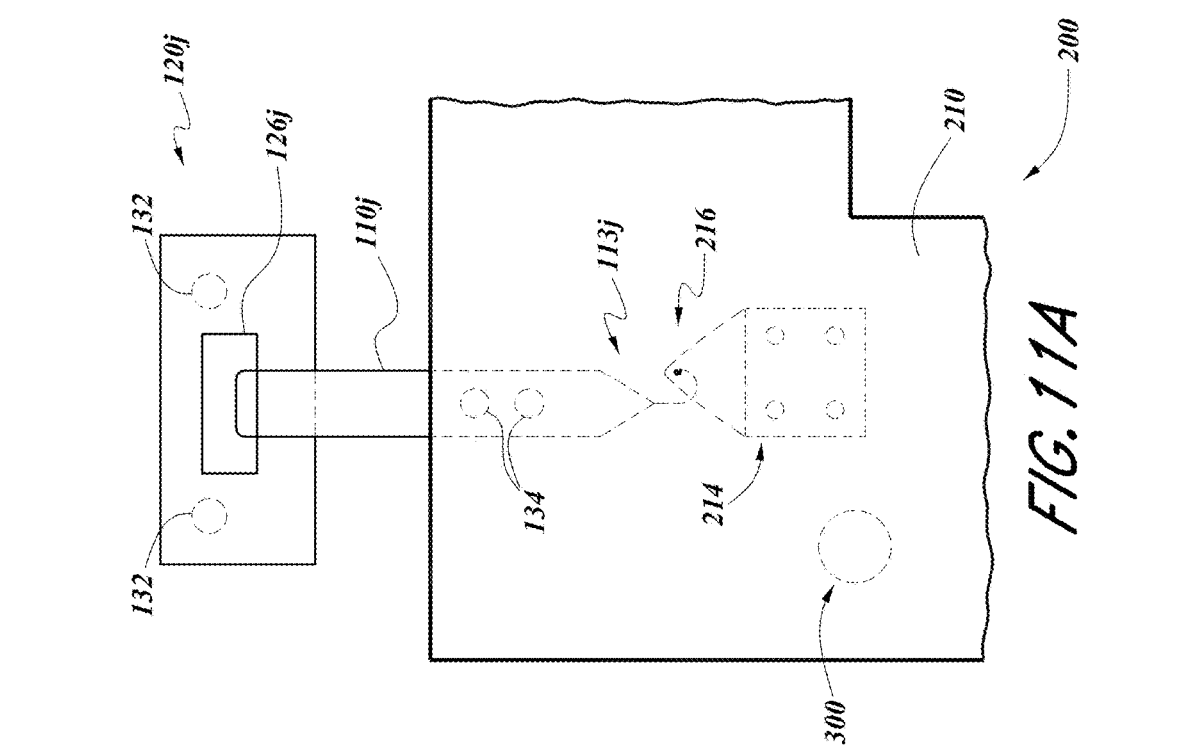

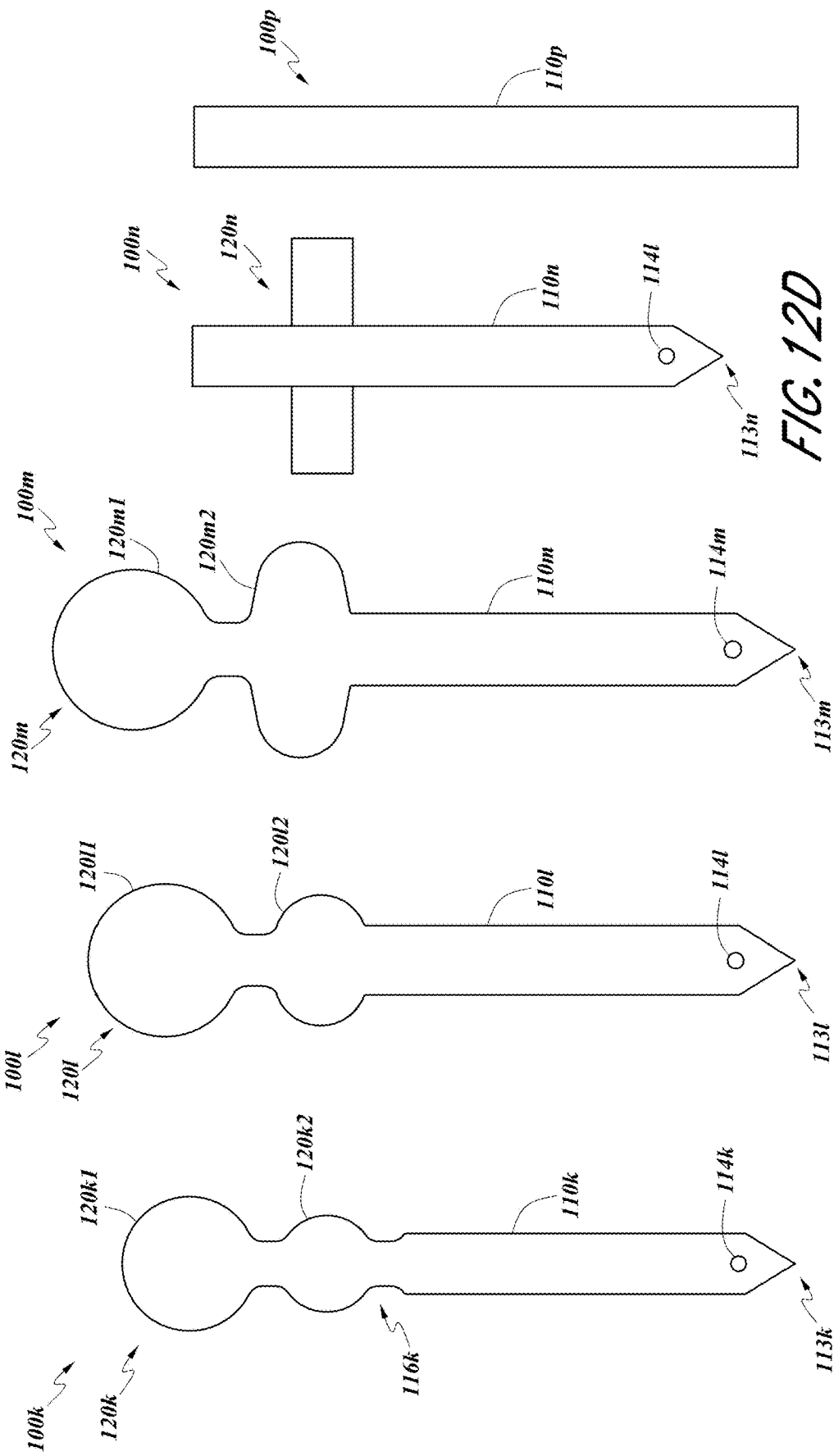

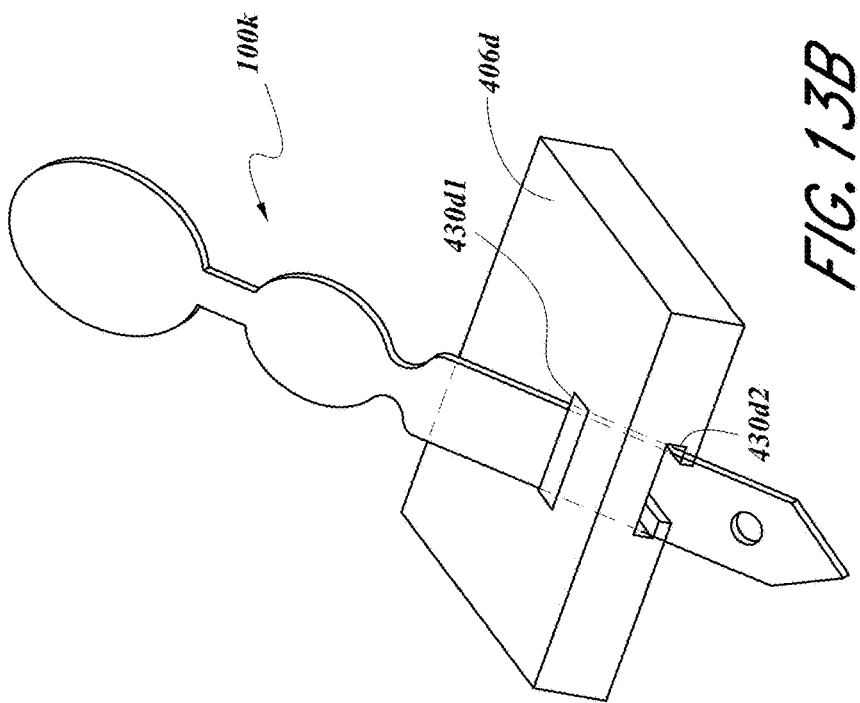
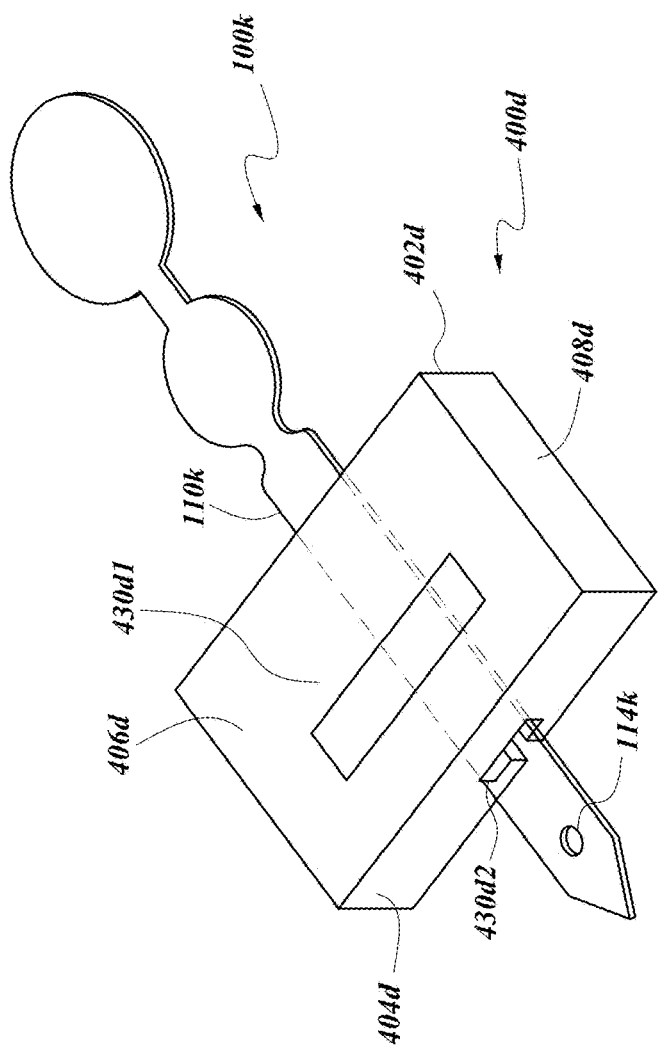
FIG. 13A
FIG. 13B

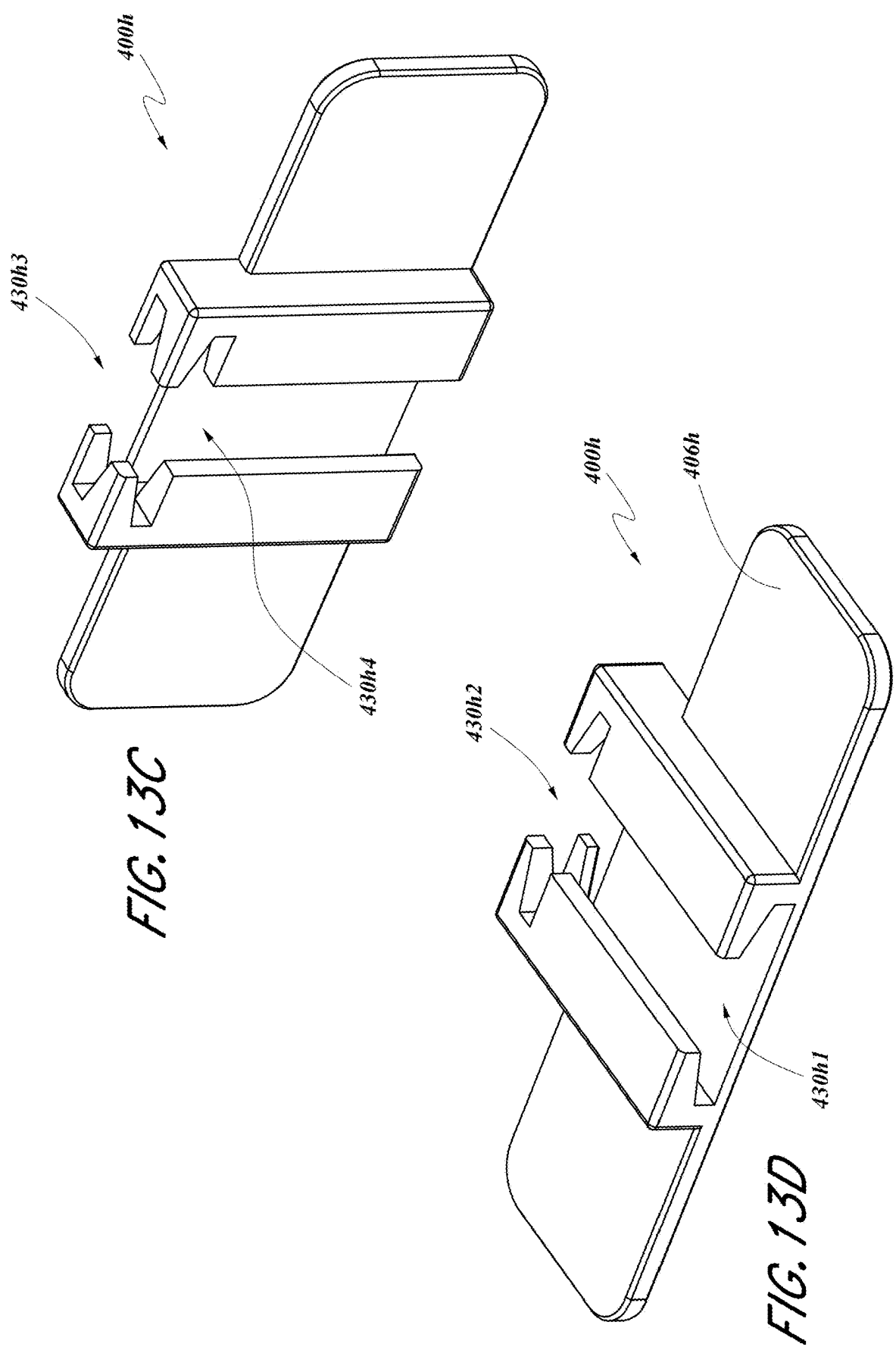

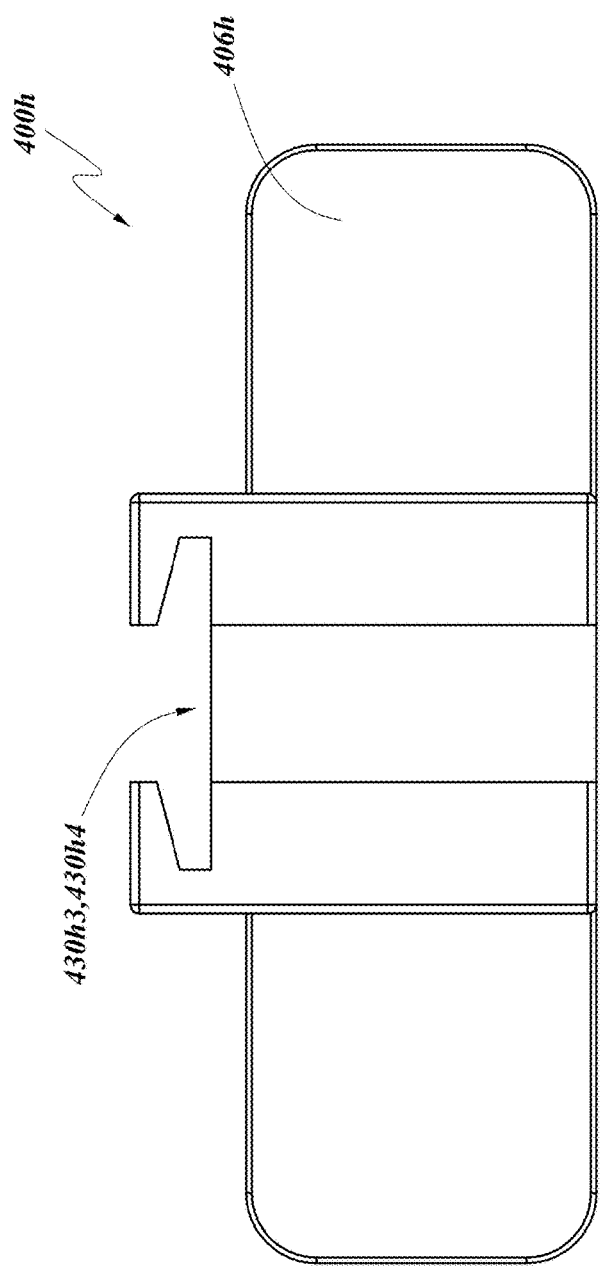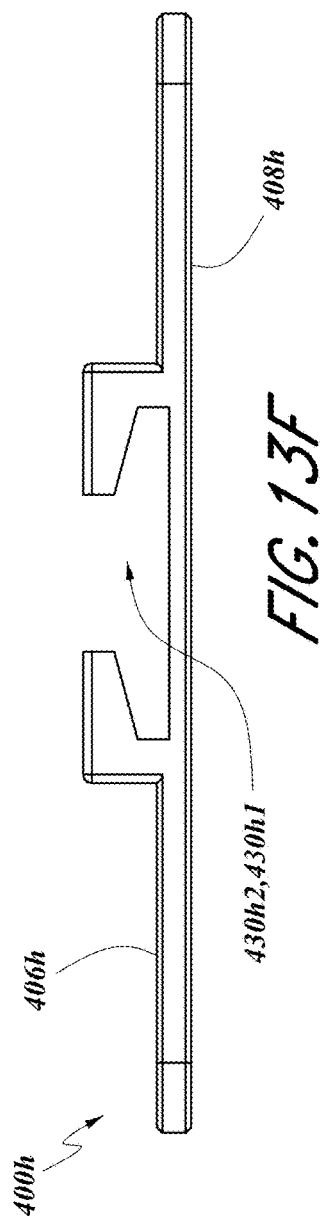

SYSTEM AND METHOD FOR HANGING A FRAME OR OBJECT ON A WALL WITHOUT TAKING MEASUREMENTS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57, and should be considered a part of this specification.

BACKGROUND

Field

The present invention is directed to a system and method for hanging frames (e.g., picture frames, paintings, etc.) or objects on a wall, and more particularly to a system and method for locating the precise position to hang frames or objects without taking measurements or using marking tools.

Description of the Related Art

Hanging frames, such as picture frames, or other objects on a wall usually involves inserting one or more nails in a wall on which the frame or object can hang. In some variations, the frame has a pair of hooks connected by a wire, and the nails inserted into the wall contact the wire to support the frame. In other variations, the frame has two or more recesses (e.g., cavities, openings) on a rear surface thereof, and the nail heads can extend into the recesses and bear against a surface of the recesses to support the frame.

However, the process of hanging frames (e.g., picture frames, paintings) or objects on walls is usually a trial and error process where the user first has to orient the frame or object into the desired orientation and elevation on the wall, and then make markings on the wall to designate the desired elevation/orientation. Additionally, because the hooks or recesses on the back of the frame or object are located inward of the outer edge of the frame (and therefore obstructed from view), it is not easy for the user to identify where to insert the nails on the wall to ensure the frame or object, once hung, is located in the desired orientation and elevation. Indeed, users often have to measure (e.g., with a ruler, a measuring tape, etc.) the distance between the top of the frame and the location of the hooks or recesses, as well as the distance between the recesses, and make similar markings (e.g., pen/pencil markings) on the wall to generally identify where the nails should be inserted into the wall. Such markings can be hard to remove, thereby sullying the wall. Sometimes these measurements are not accurate, requiring multiple trials, and multiple markings that further sully the wall, or multiple holes made on the wall when the nail needs to be repositioned to provide the desired mounting location for the frame or object. Alternatively, if such measurements are not made, the user can estimate the location of where the hooks or recesses are relative to the wall to insert the nails in the wall, but this process often requires multiple trials, which may lead to multiple holes being made in the wall, as such estimates are often wrong.

SUMMARY

There is a need for an improved system and method that allows the hanging of frames (e.g., picture frames, paintings, etc.) or other objects with ease and in an accurate manner, and without requiring taking measurements or making pencil/pen markings on the wall (nor the tools required to take measurements or make pencil/pen markings) to hang the frame or object.

In accordance with one aspect of the invention, a system is provided for hanging frames (e.g., picture frames, paintings) or other objects on a wall without requiring taking measurements or use of measuring tools to identify the location at which to insert nails to hang the frame in the desired elevation and orientation.

In accordance with one aspect, the system includes one or more strips removably attached to a rear portion of the frame or object, such that a proximal end of the strips protrudes from an outer edge (e.g., a top edge, side edge, bottom edge, etc.) of the frame or object, and a distal end of each of the strips is substantially aligned with a location of a hook or recess on the rear portion of the frame or object. The proximal end of the strips is configured to adhere to a wall surface when pressed thereto, allowing the frame or object to be detached from the strips while the strips remain on the wall, where the distal ends of the strips identify the location where nails can be inserted into the wall to hang the frame or object in the desired elevation and/or orientation.

In accordance with another aspect, a system for hanging and object at a desired location on a wall without taking measurements is provided, where the object has one or more hooks, recesses or openings on a mounting surface thereof. The system comprises one or more marking strips removably attachable to a mounting surface of the object, each marking strip being substantially planar along its entire length. The one or more marking strips comprise an elongate body that extends linearly from a proximal end to a distal end, a proximal head attached to the proximal end of the elongate body, and one or more adhesive portions disposed on a surface of the proximal head that faces away from the object when the marking strip is attached to the object. The one or more marking strips are configured to removably attach to the rear surface of the object so that the distal end of the elongate body aligns with a mounting hook, recess or opening on a mounting surface of the object and so that the proximal head protrudes from an edge of the object. The proximal portion adheres to a wall surface when pressed thereto once a desired location for hanging the object is determined, allowing the object to be detached from the marking strip to leave the marking strip attached on the wall surface, the distal end of the elongate body indicating a location for insertion of a fastener to mount the object in the desired location In accordance with another aspect, a method for hanging an object at a desired location on a wall without taking measurements is provided, the object having one or more mounting hooks, recesses or openings on a mounting surface thereof. The method comprises attaching one or more substantially planar marking strips to the mounting surface of the object. The one or more marking strips have an elongate body that extends linearly from a proximal end to a distal end and a proximal head attached to the proximal end of the elongate body. The one or more marking strips are attached to the mounting surface so that the proximal head protrudes from an edge of the object and so an elongate body aligns with a mounting hook, recess or opening on the mounting surface. The method also comprises positioning the object against a wall surface at a desired mounting location. The method also comprises pressing the proximal head of the one or more marking strips against the wall surface to removably adhere the proximal head against the wall surface. The method also comprises withdrawing the object from the wall surface, thereby leaving the proximal head of the marking strip attached to the wall surface, the distal end of the elongate body identifying a location for insertion of a fastener to mount the object in the desired mounting location.

In accordance with another aspect, a kit for hanging an object at a desired location on a wall without taking measurements is provided, the object having one or more hooks, recesses or openings on a mounting surface thereof. The kit comprises a plurality of substantially planar marking strips, each having an elongate body that extends linearly from a proximal end to a distal end and a proximal head attached to the proximal end of the elongate body. The elongate body is removably attachable to a mounting surface of the object so that the distal end of the elongate body aligns with a mounting hook, recess or opening on a mounting surface of the object and so that the proximal head protrudes from an edge of the object. The proximal portion adheres to a wall surface when pressed thereto once a desired location for hanging the object is determined, allowing the object to be detached from the marking strip to leave the marking strip attached on the wall surface, the distal end of the elongate body indicating a location for insertion of a fastener to mount the object in the desired location. The kit also comprises a plurality of spacers, each spacer removably coupleable to the mounting surface of the object. The one or more spacers have a thickness greater than a thickness of the marking strip to allow repositioning of the object while in contact with the wall without altering a position of the one or more marking strips relative to the object. The kit also comprises a plurality of adhesive portions attachable to one or both of the elongate body and proximal head of the marking strips to attach the marking strips to the mounting surface of the object or attach the proximal head to the wall surface.

BRIEF DESCRIPTION OF THE DRAWINGS

FIGS. 1A-1H each show a schematic top view of a marking strip.

FIG. 2A-2B show a schematic view of a marking strip attached to a rear portion of a frame.

FIG. 3 shows a schematic view of a pair of marking strips attached to a rear portion of a frame.

FIG. 6A shows a schematic top view of a marking strip.

FIG. 6B shows a schematic top view of the proximal portion of the marking strip attached to the wall after the frame with the distal portion of the marking strip have been removed.

FIGS. 8A-8C show schematic perspective, top and cross-sectional views of a pad coupleable to a rear portion of a frame for use with the marking strips.

FIG. 10A shows a schematic top view of a marking strip.

FIG. 10B shows the marking strip of FIG. 10A with the proximal portion detached from the distal portion of the marking strip.

FIG. 11A shows a schematic top view of the marking strip of FIG. 10A attached to a rear portion of a frame.

FIG. 11B shows a schematic top view of the proximal portion of the marking strip of FIG. 10A attached to the wall after the frame with the distal portion of the marking strip have been removed.

FIGS. 12A-E each show a schematic top view of a marking strip.

FIG. 13A shows a schematic view of a marking strip extending through a pad in one orientation.

FIG. 13B shows a schematic view of the marking strip of FIG. 13A extending through the pad of FIG. 13A in another orientation.

FIGS. 13C-13F show schematic perspective top, perspective front, top and side views of a pad coupleable to a top edge or rear surface of a frame or object for use with the marking strips.

DETAILED DESCRIPTION

Figure 2B:
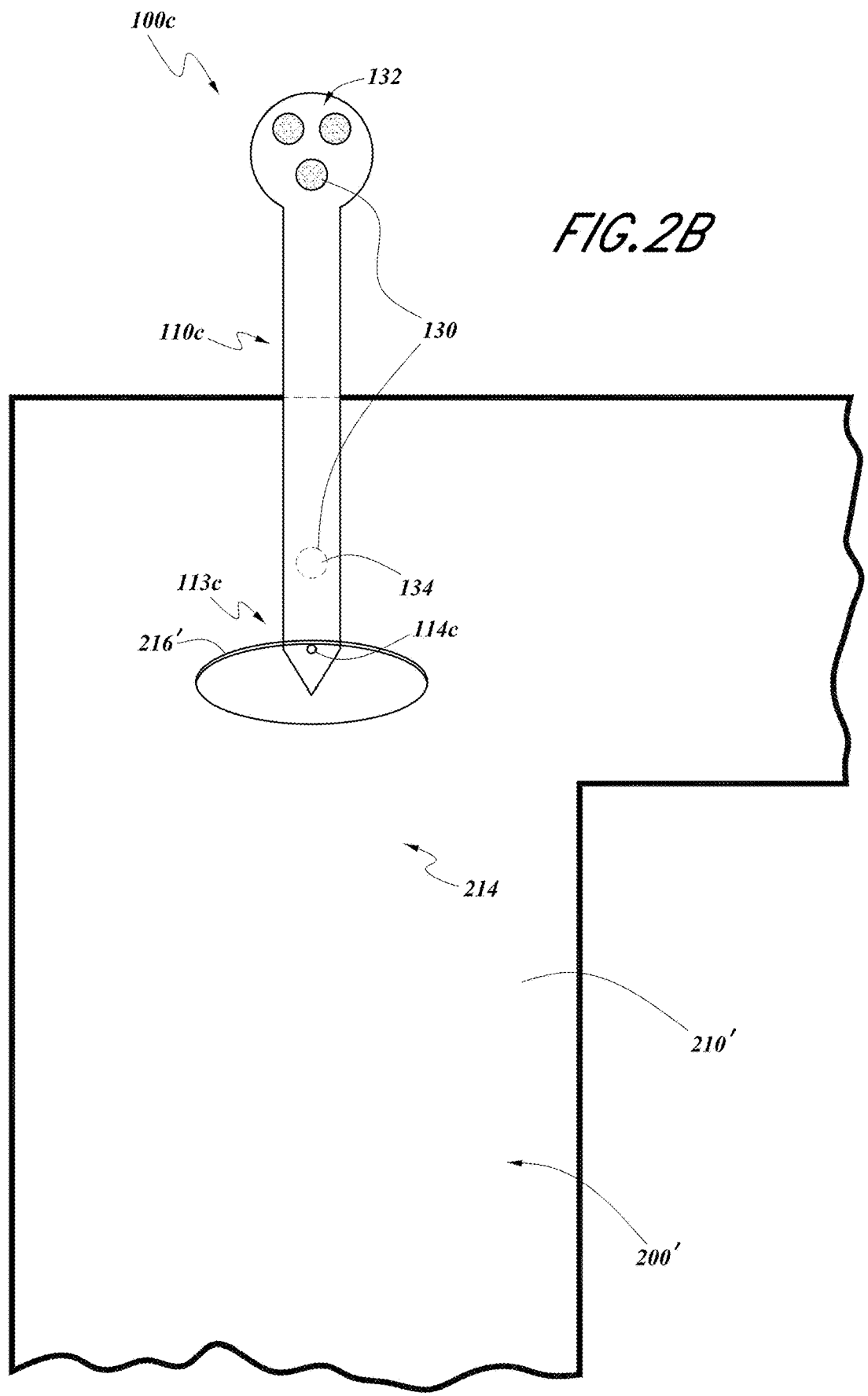

FIG. 1A shows a marking strip 100A for use with a frame (e.g., picture frame, painting) or object to identify or mark the location where the frame or object is to be hung (e.g., mark the location where a fastener, such a nail, can be inserted on a wall to hang the frame or object in the desired location). The marking strip 100A has an elongate body 110A that extends to a distal end 113A and a proximal portion or head 120A attached to a proximal end 112A of the elongate body 110A. Optionally, the distal end 113A can be pointed (e.g., have a substantially V-shape).

Optionally, the elongate body 110A and the proximal portion or head 120A form a single piece (e.g., a monolithic piece). Optionally, the marking strip 100A is substantially planar (e.g., flat) from end to end. Optionally, the marking strip 100A has a substantially constant thickness (e.g., between its front surface and rear surface) along its entire length. Optionally, the proximal portion 120A extends generally perpendicular to the elongate body 110A. Optionally, the proximal portion 120A has a larger surface area than a section of the elongate body 110A having the same length. The marking strip 100A can be made of plastic, woven plastic strapping, paper, cardboard, wood, metal or other suitable rigid or semi-rigid materials. The marking strip 100A is substantially straight and lightweight. Optionally, the marking strip 100A does not substantially bend when held from one end and does not substantially stretch when pulled on (e.g., lightly pull on proximal and distal ends of strip 100A).

FIG. 1B shows another embodiment of a marking strip 100B. The marking strip 100B is constructed similar to the marking strip 100A shown in FIG. 1A, except as noted below. Thus, the reference numerals used to designate the various features of the marking strip 100B are identical to those used for identifying the corresponding features of the marking strip 100A in FIG. 1A, except that a "B" has been added to the reference numerals instead of an "A". Further, the description of the features of the marking strip 100A also apply to the corresponding features of the marking strip 100B, except as noted below.

The marking strip 100B differs from the marking strip 100A in that the proximal portion 120B is defined by a generally curved outer perimeter. Optionally, the proximal portion 120B has an outer perimeter with generally circular shape.

FIG. 1C shows another embodiment of a marking strip 100C. The marking strip 100C is constructed similar to the marking strip 100B shown in FIG. 1B, except as noted below. Thus, the reference numerals used to designate the various features of the marking strip 100C are identical to those used for identifying the corresponding features of the marking strip 100B in FIG. 1B, except that a "C" has been added to the reference numerals instead of an "B". Further, the description of the features of the marking strip 100B also apply to the corresponding features of the marking strip 100C, except as noted below.

The marking strip 100C differs from the marking strip 100B in that the distal end 113C of the elongate body 110C has a fastener locator 114C that can receive a fastener (e.g., nail, pin, etc.) therethrough. Optionally, the fastener locator 114C can be a hole or aperture. Alternatively, the fastener locator 114C can be a marking or frangible portion (e.g., perforated portion, such as perforated circle) in the elongate body 110C. The fastener locator can optionally be incorporated into any of the marking strips disclosed herein (e.g., marking strips 100A-P)

FIG. 1D shows another embodiment of a marking strip 100D. The marking strip 100D is constructed similar to the marking strip 100C shown in FIG. 1C, except as noted below. Thus, the reference numerals used to designate the various features of the marking strip 100D are identical to those used for identifying the corresponding features of the marking strip 100C in FIG. 1C, except that a "D" has been added to the reference numerals instead of an "C". Further, the description of the features of the marking strip 100C also apply to the corresponding features of the marking strip 100D, except as noted below.

The marking strip 100D differs from the marking strip 100C in that a level 124D is provided on (e.g., attached to) the proximal portion 120D of the marking strip 100D. The level 124D is optionally a bubble level, such as a tubular spirit level or a circular bulls-eye level. However, other suitable level types can be used. Optionally, where the proximal portion 120D is excluded, the level 124D is provided on (e.g. attached to) the proximal end 112D of the elongate body 110D. The level 124D can optionally be incorporated into any of the marking strips disclosed herein (e.g., marking strips 100A-P). The level 124D, when the marking strip 100D is attached to the frame or object, can aid the user in determining a level orientation for the frame or object on the wall. The level 124D can aid the user in attaching the marking strip 100D to a rear surface of the frame or object so that the marking strip 100D is level relative to the frame or object.

FIG. 1E shows another embodiment of a marking strip 100E. The marking strip 100E is constructed similar to the marking strip 100C shown in FIG. 1C, except as noted below. Thus, the reference numerals used to designate the various features of the marking strip 100E are identical to those used for identifying the corresponding features of the marking strip 100C in FIG. 1C, except that a "E" has been added to the reference numerals instead of an "C". Further, the description of the features of the marking strip 100C also apply to the corresponding features of the marking strip 100E, except as noted below.

The marking strip 100E differs from the marking strip 100C in that markings (e.g., graduated markings) or indicators (e.g., numbers, colors, lines) 116E are provided on the elongate body 110E to indicate how far the marking strip 100E protrudes from an edge (e.g., a top edge) of the frame or object (e.g., when attached to the frame or object, as further discussed below). The markings 116E provide a visual mark that advantageously alerts the user of the location of the strip relative to the frame, for example if the marking strip 100E accidentally moves thereby introducing an error as to where the distal end 113E of the elongate body 110E, and therefore where the fastener to be inserted into the wall, should be. The markings or indicators 116E can optionally be incorporated into any of the marking strips disclosed herein (e.g., marking strips 100A-P).

FIG. 1F shows another embodiment of a marking strip 100F. The marking strip 100F is constructed similar to the marking strip 100C shown in FIG. 1C, except as noted below. Thus, the reference numerals used to designate the various features of the marking strip 100F are identical to those used for identifying the corresponding features of the marking strip 100C in FIG. 1C, except that a "F" has been added to the reference numerals instead of an "C". Further, the description of the features of the marking strip 100C also apply to the corresponding features of the marking strip 100F, except as noted below.

The marking strip 100F differs from the marking strip 100C in that the elongate body 100F has a variable length. The marking strip 100F has a section with crease lines 116F at which the elongate body 110F can be folded to vary the length of (e.g., make shorter or longer) the elongate body 100F and thereby the marking strip 100F.

FIG. 1G shows another embodiment of a marking strip 100G. The marking strip 100G is constructed similar to the marking strip 100C shown in FIG. 1C, except as noted below. Thus, the reference numerals used to designate the various features of the marking strip 100G are identical to those used for identifying the corresponding features of the marking strip 100C in FIG. 1C, except that a "G" has been added to the reference numerals instead of an "C". Further, the description of the features of the marking strip 100C also apply to the corresponding features of the marking strip 100G, except as noted below.

The marking strip 100G differs from the marking strip 100C in that the elongate body 110G has a variable length. The elongate body 110G is defined by two or more segments joined at a joint 116G that allows the segments to pivot relative to each other (e.g., have one segment pivot over or overlay another segment) to vary the length of (e.g., make shorter or longer) the elongate body 100G and thereby the marking strip 100G.

FIG. 1H shows another embodiment of a marking strip 100H. The marking strip 100H is constructed similar to the marking strip 100C shown in FIG. 1C, except as noted below. Thus, the reference numerals used to designate the various features of the marking strip 100H are identical to those used for identifying the corresponding features of the marking strip 100C in FIG. 1C, except that a "H" has been added to the reference numerals instead of an "C". Further, the description of the features of the marking strip 100C also apply to the corresponding features of the marking strip 100H, except as noted below.

The marking strip 100H differs from the marking strip 100C in that the elongate body 100H has a variable length. The elongate body 110H is defined by two or more telescoping segments 116H, where one segment 116H2 can telescopingly extend relative to another segment 116H1 to vary the length of (e.g., make shorter or longer) the elongate body 100H and thereby the marking strip 100H.

FIG. 2A shows a partial view of a frame 200 with a marking strip 100C attached (e.g., removably attached) to a rear surface 210 of the frame 200. The frame 200 has a bracket 214 that supports a hook 216. Optionally, the hook 216 has a V-shape. The marking strip 100C is attached to the rear surface 210 of the frame 200 so that the proximal portion 120C protrudes from the edge (e.g., top edge) of the frame 200 and at least a portion of the elongate body 110C is attached (e.g., removably attached) to the rear surface 210. Optionally, the marking strip 100C protrudes by a few inches (e.g., 1 inch, 1 ½ inches, 2 inches, 3 inches, etc.) past the outer edge (e.g., top edge) of the frame 200. For example, where the hook 216 or recess 216' (see FIG. 2B) are located about 6 inches from the top edge of the frame 200, the marking strip 100C can optionally have a length of about 10-12 inches, or about 8-10 inches or about 7-9 inches so that the proximal portion 120C protrudes from the outer edge (e.g., top edge) of the frame 200. The marking strip 100C can have other suitable lengths (e.g., longer than 12 inches, shorter than 7 inches) that allows it to protrude from the outer edge of the frame 200.

The marking strip 100C is attached to the rear surface 210 so that the distal end 113C of the elongate body 100C substantially aligns with the top of the hook 216 (e.g., with the v-shaped end of the hook 216). Optionally, the fastener locator 114C (e.g., aperture, hole) of the elongate body 110C substantially aligns with the top of the hook 216 (e.g., with the v-shaped end of the hook).

The marking strip 100C is removably attached to the rear surface 210 of the frame 200, for example, with an adhesive 130. The adhesive 130 can optionally be a low-tack adhesive, removable adhesive (e.g., glue dots), double-sided adhesive or adhesive tape, pressure sensitive adhesive, vacuum/suction cup; the adhesive 130 can be other suitable types. For example, adhesive 134 on the elongate body 110C can removably secure the elongate body 110C to the rear surface 210. Additionally, adhesive 132 can be disposed on the proximal portion 120C of the marking strip 100C for removably securing the proximal portion 120C to the wall surface when pressed thereto, as further discussed below. Optionally, the amount of adhesive 134 applied on the elongate body 110C is less than the amount of adhesive applied on the proximal portion 120C (or the adhesive 134 can optionally have a lower adhesive strength than the adhesive 132), thereby allowing the elongate body 110C to detach from the rear surface 210 while inhibiting the proximal portion 120C from detaching from the wall surface when the frame 200, 200' or object to be hung is withdrawn (e.g., lowered) away from the proximal portion 120C, as described further below. The marking strip 100C is optionally attached to the rear surface so that the elongate body 110C extends substantially perpendicular to a top edge and/or bottom edge of the frame.

Other suitable mechanisms for attaching the marking strip 100C to the frame 200 can be used (e.g., VELCRO® hoop and loop fasteners). For example, where the marking strip 100C is made of metal, the rear surface of the frame 200 can have a magnet that removably secures the marking strip 100C to the rear surface 210. Alternatively, the magnet can be disposed on the marking strip 100C and the rear surface 210 can have a metal surface for facilitating coupling of the marking strip 100C to the rear surface 210.

Though FIG. 2A shows the marking strip 100C attached to the rear surface 210 of the frame 200, one of skill in the art will recognize that the marking strip 100C can removably attach to a rear surface of an object to be hung (e.g., ornament, knick knack, shelving, artwork, mirror, television bracket, wall mount television, decoration, etc.) in a similar manner to facilitate hanging of the object. Further, though FIG. 2A shows the use of marking strip 100C, any of the marking strips disclosed herein (e.g., marking strips 100A-P) can be used.

FIG. 2B shows a partial view of a frame 200' with a marking strip 100C attached (e.g., removably attached) to a rear surface 210' of the frame 200'. The frame 200' is constructed similar to the frame 200 shown in FIG. 2A, except as noted below. Thus, the reference numerals used to designate the various features of the frame 200' are identical to those used for identifying the corresponding features of the frame 200 in FIG. 2A, except that a " ' " has been added to the reference numerals. Further, the description of the features of the frame 200 also apply to the corresponding features of the frame 200', except as noted below.

The frame 200' differs from the frame 200 in that it has a recess or cavity 216' instead of a bracket 214 and hook 216. The marking strip 100C is attached to the rear surface 210' of the frame 200' so that the proximal portion 120C protrudes from the edge (e.g., top edge) of the frame 200' and at least a portion elongate body 110C is attached (e.g., removably attached) to the rear surface 210'. The marking strip 100C is attached to the rear surface 210' so that the distal end 113C of the elongate body 100C substantially aligns with the top of the recess or cavity 216'. Optionally, the fastener locator 114C (e.g., aperture, hole) of the elongate body 110C substantially aligns with the top of the recess or cavity 216'.

The marking strip 100C is removably attached to the rear surface 210' of the frame 200, for example, with an adhesive 130, as described above for FIG. 2A. For example, adhesive 134 on the elongate body 110C can removably secure the elongate body 110C to the rear surface 210'. Additionally, adhesive 132 can be disposed on the proximal portion 120C of the marking strip 100C for removably securing the proximal portion 120C to the wall surface when pressed thereto, as further discussed below. Other suitable mechanisms for attaching the marking strip 100C to the frame 200' can be used, such as hoop and loop fasteners (e.g., VELCRO®). For example, where the marking strip 100C is made of metal, the rear surface of the frame 200' can have a magnet that removably secures the marking strip 100C to the rear surface 210'. Alternatively, the magnet can be disposed on the marking strip 100C and the rear surface 210' can have a metal surface for facilitating coupling of the marking strip 100C to the rear surface 210'.

Though FIG. 2B shows the marking strip 100C attached to the rear surface 210' of the frame 200', one of skill in the art will recognize that the marking strip 100C an removably attach to a rear surface of an object to be hung (e.g., ornament, knick knack, shelving) in a similar manner to facilitate hanging of the object. Further, though FIG. 2B shows the use of marking strip 100C, any of the marking strips disclosed herein (e.g., marking strips 100A-P) can be used.

FIG. 3 shows a partial view of the frame 200 in FIG. 2A with a pair of marking strips 100C attached (e.g., removably attached) to the rear surface 210 of the frame 200. Additionally, one or more (e.g., a pair) of tabs or spacers 300 are attached (e.g., removably attached, such as with an adhesive) to the rear surface 210 of the frame 200. Optionally, the tabs or spacers 300 can have a top surface with a relatively soft material (e.g., felt) so that the tabs 300 do not scratch the wall surface as the frame 200, 200' or object to be hung is moved on the wall to identify the desired location (e.g., elevation, orientation) at which it's to be hung. Optionally, the tabs 300 can include a rolling surface (e.g., bearing surface) that can facilitate movement of the tabs 300 on the wall surface as the frame 200, 200' or object to be hung is moved while in contact with the wall surface.

The tabs 300 advantageously maintain a clearance between the frame 200 and the surface (e.g., wall surface) on which the frame 200 is to be hung, so that as the frame 200 is moved on the surface (e.g., to identify the desired elevation and orientation for the frame 200), the marking strips 100C remain substantially fixed on (e.g., do not more, are not dislodged from) the rear surface 210 of the frame 200. Therefore, the tabs 300 advantageously inhibit dislodgement/detachment of the marking strips 100C while the frame 200 is moved, thereby inhibiting misalignment of the marking strips 100C with the top of the hook 216 or cavity 216' and avoiding errors in where the fasteners (e.g., nails) are to be inserted on the wall surface.

Optionally, each tab 300 can have a thickness greater than a thickness of the marking strip 100C and the adhesive 134, to thereby provide adequate clearance from the rear surface 210 to avoid such dislodgement/detachment or otherwise movement of the marking strip 100C while moving the frame 200.

Though FIG. 3 shows the marking strip 100C attached to the rear surface 210 of the frame 200, one of skill in the art will recognize that the marking strip 100C an removably attach to a rear surface of an object to be hung (e.g., ornament, knick knack, shelving) in a similar manner to facilitate hanging of the object. Further, though FIG. 3 shows the use of marking strip 100C, any of the marking strips disclosed herein (e.g., marking strips 100A-P) can be used.

Figure 4:
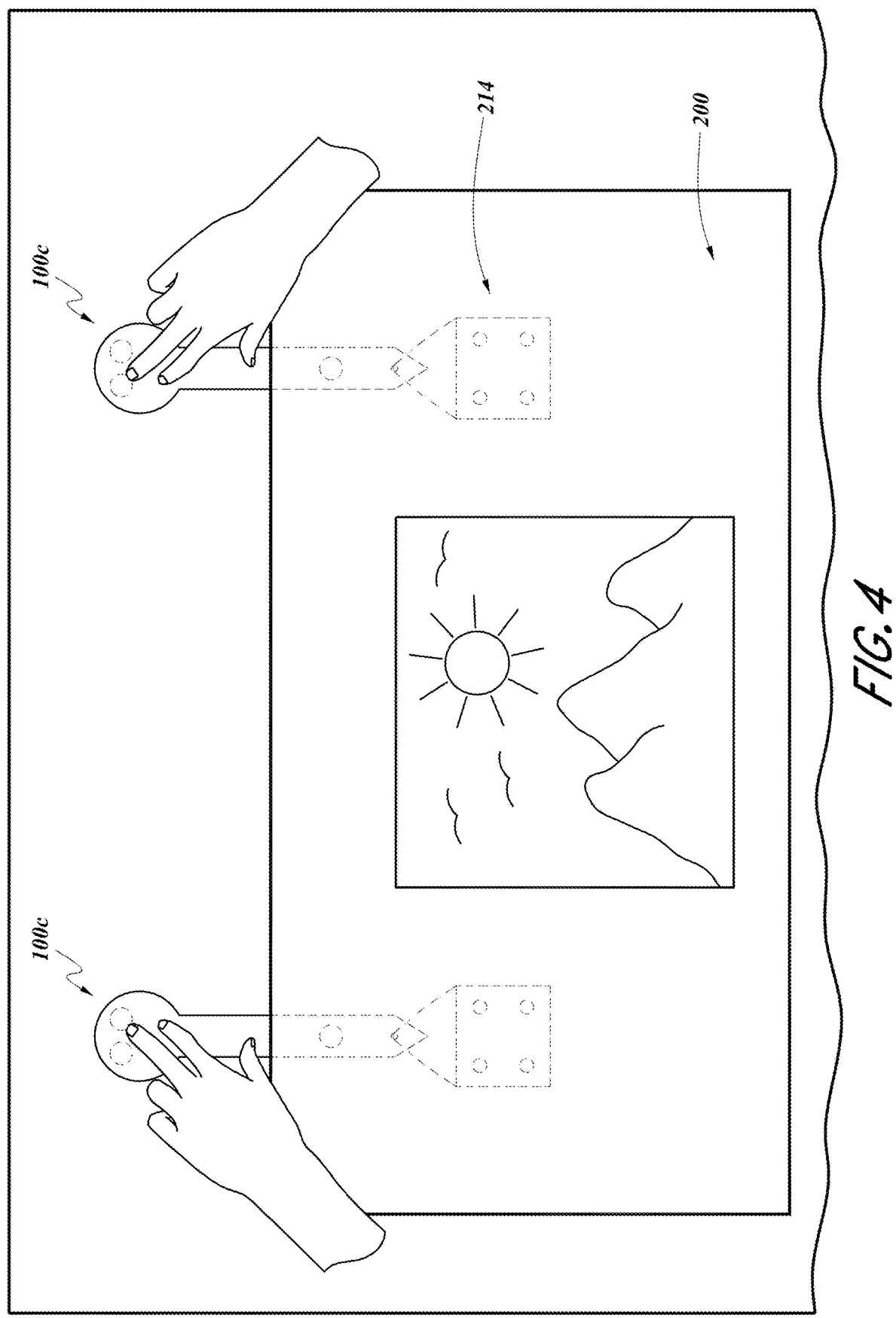
FIG. 4 shows a schematic view of a pair of marking strips attached to a rear portion of the frame and pressed to the wall on which the frame is to be hung.
Figure 5:
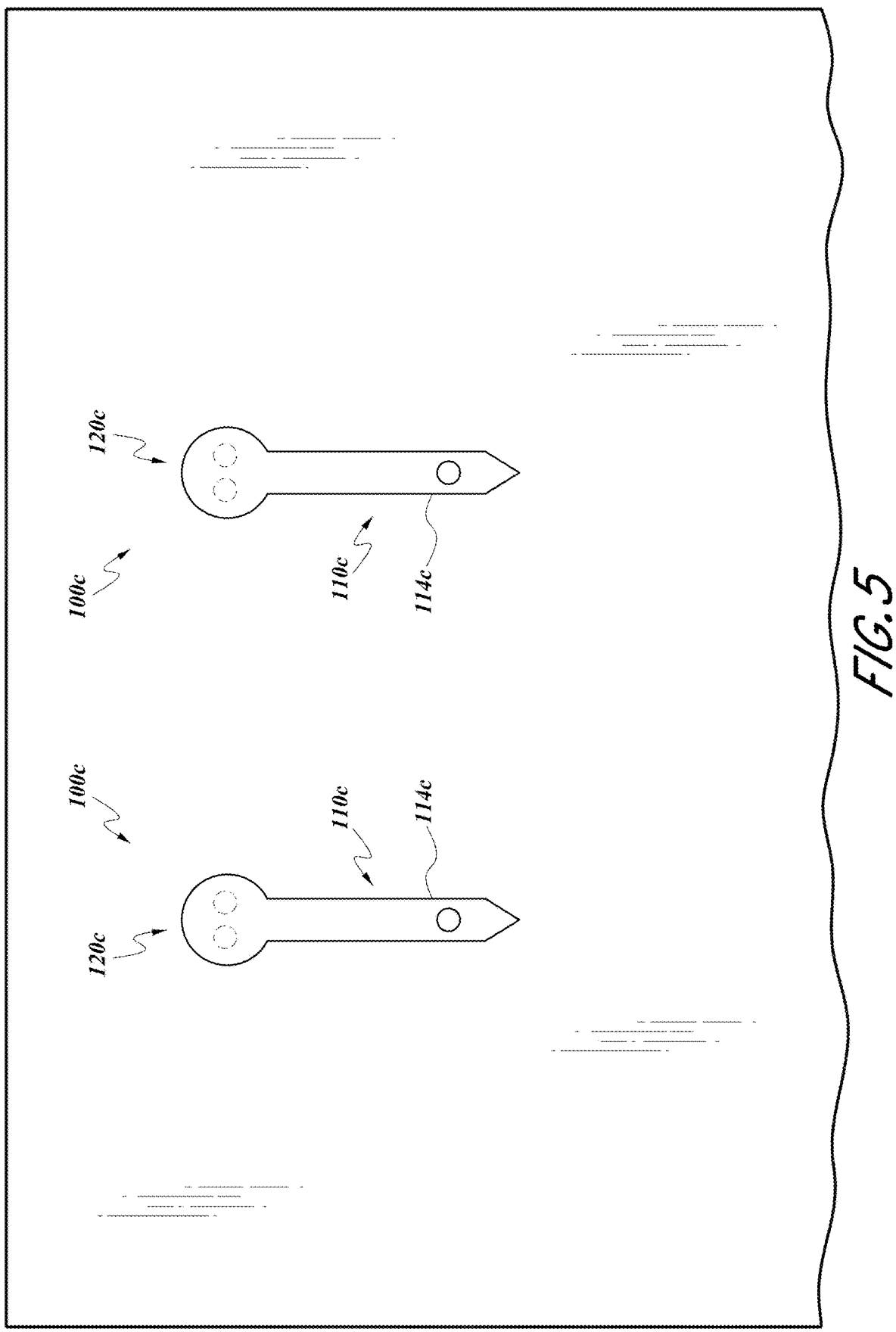
FIG. 5 shows the pair of marking strips of FIG. 4 once the frame has been detached from the marking strips.

FIG. 4 shows a front view of a picture frame against a wall surface, where the proximal portion 120C of the marking strips 100C are pressed against the wall surface once the desired location (e.g., elevation, orientation) of the frame 200 is obtained, the adhesive 132 on the proximal portion 120C allowing the proximal portions 120C to removably adhere to the wall surface. Once the frame 200 is removed or withdrawn (e.g., lowered relative to the proximal portions 120C) following the pressing of the marking strips 100C (e.g., the pressing of the proximal portions 120C of the marking strips 100C) onto the wall surface, the marking strips 100C remain on the wall surface, as shown in FIG. 5. The fastener locators (e.g., holes, apertures) 114C indicate where the fasteners are to be inserted to thereafter hang the frame 200 in the predetermined desired location.

Though FIGS. 4-5 shows the marking strip 100C attached to the frame 200, one of skill in the art will recognize that the marking strip 100C can removably attach to a rear surface of an object to be hung (e.g., ornament, knick knack, shelving) in a similar manner to facilitate hanging of the object. Further, though FIGS. 4-5 shows the use of marking strip 100C, any of the marking strips disclosed herein (e.g., marking strips 100A-P) can be used.

FIG. 6A shows another embodiment of a marking strip 100I. The marking strip 100I is constructed similar to the marking strip 100C shown in FIG. 1C, except as noted below. Thus, the reference numerals used to designate the various features of the marking strip 100I are identical to those used for identifying the corresponding features of the marking strip 100C in FIG. 1C, except that a "I" has been added to the reference numerals instead of an "C". Further, the description of the features of the marking strip 100C also apply to the corresponding features of the marking strip 100I, except as noted below.

The marking strip 100I differs from the marking strip 100C in that the proximal portion 1201 is detachable from the elongate body 110I. The proximal portion 1201 can be removably attached to the proximal end 1121 of the elongate body 110I via a pocket or sleeve 1161 that receives the proximal end 1121. Other suitable mechanisms for removably coupling the proximal portion 1201 to the elongate body 110I can be used. For example, a pin on one of the proximal portion 1201 or proximal end 1121 can removably engage a hole or aperture on the other of the proximal portion 1201 or proximal end 1121. Alternatively, the proximal portion 1201 can removably attach to the proximal end 1121 of the elongate body 1101 via an adhesive, such as the adhesive 130, a hoop and loop fastener (e.g., VELCRO®), a magnet, etc. Allowing for the detachment of the proximal portion 1201 from the elongate body 1001 can facilitate the withdrawal (e.g., lowering) of the frame 200 once the desired location (e.g., elevation, orientation) has been determined and the proximal portion 1201 pressed against the wall surface, without moving or altering the orientation of the marking strip 100I as the frame 200 is removed.

FIG. 6B shows a partial view of the frame 200 with the marking strip 100I attached to the rear surface 210 of the frame 200, in a similar manner as described above for FIG. 2A (e.g., with adhesive 134). In use, the proximal portion 1201 is pressed against the wall surface once the desired location (e.g., elevation, orientation) of the frame 200 has been determined, and the frame 200 withdrawn (e.g., lowered), allowing the proximal portion 1201 to detach from the elongate body 1101, leaving the proximal portion 1201 on the wall surface. The elongate body 110I can then be detached by the user from the rear surface 210 of the frame 200 and recoupled to the proximal portion 1201. The fastener locators (e.g., holes, apertures) 1141 on the elongate body 1101, once recoupled to the proximal portion 1201, indicate where the fasteners are to be inserted to thereafter hang the frame 200 in the predetermined desired location.

Though FIG. 6B shows the marking strip 1001 attached to the frame 200, one of skill in the art will recognize that the marking strip 1001 can removably attach to a rear surface of an object to be hung (e.g., ornament, knick knack, shelving) in a similar manner to facilitate hanging of the object. Further, though FIG. 6B shows the use of marking strip 1001, any of the marking strips disclosed herein (e.g., marking strips 100A-P) can be used. Further, a level, such as the level 124D, can optionally be attached to the proximal portion 1201.

Figure 7B:
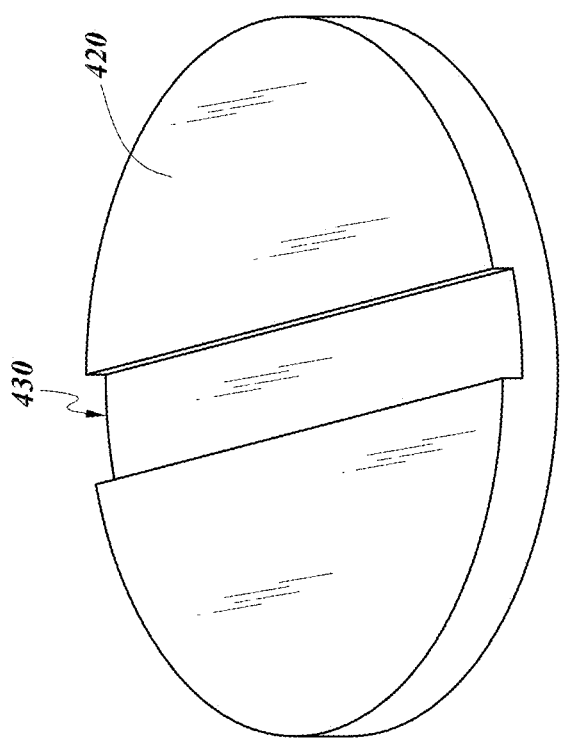
FIGS. 7A-7B show schematic perspective bottom and top views of a pad coupleable to a rear portion of a frame for use with the marking strips.
Figure 7A:
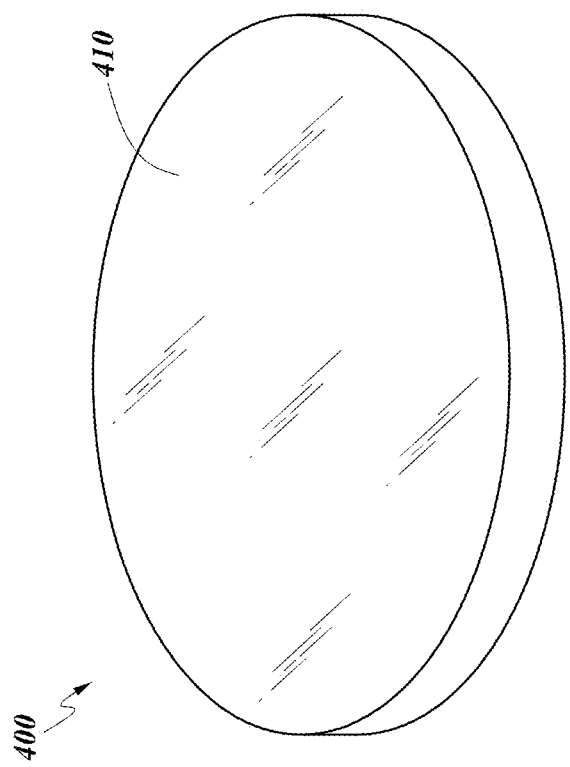

FIGS. 7A-7B show a pad 400 for use with the marking strip 100A-P for facilitating the location for inserting fasteners in a wall to hang a frame, such as frame 200, 200', or object on a wall surface. The pad 400 has a bottom surface 410 and a top surface 420 on an opposite side from the bottom surface 410. Optionally, the bottom surface 410 is substantially planar. Optionally, the top surface 420 has a recess 430 defined therein that extends across the top surface 420. Optionally, the recess 430 defines a channel; optionally, the channel can have a constant depth along the length of the recess 430 (e.g., from one outer edge of the pad 400 to another opposite edge of the pad 400). Optionally, the recess 430 has a width that is substantially equal to a width of the elongate body 110A-110L (e.g., slightly narrower, such as by 0.5%, 1%, etc., than the elongate body 110A-110L). Use of the pad 400 is discussed further below.

The pad 400 can be made of plastic, wood, cardboard, metal or other suitable material. Though the pad 400 is shown as having a circular outer profile, one of skill in the art will recognize that the pad 400 can have other suitable outer shapes (e.g., square, rectangular, oval, octagonal, hexagonal, etc.). Optionally, a level, such as the level 124D, can be attached to the top surface 420 of the pad 400 to facilitate attachment of the pad 400 on the rear surface of the frame or object in a level orientation.

Optionally, a tab (e.g., tapered tab) on the pad 400 (e.g., on the recess 430 of the pad 400) can assist in retaining the elongate body 110C substantially fixed in the recess 430 until pulled. Other suitable locking mechanisms for retaining the elongate body 110C in the recess 430 can be used (e.g., magnet, VELCRO®, press fit). Optionally, the pad 400 can be attached to the rear surface of the frame or object so that the top surface 420 faces away from the rear surface of the frame or object. Alternatively, the pad 400 can be attached to the rear surface of the frame or object so that the top surface 420 faces toward the rear surface of the frame or object.

FIGS. 8A-8C show another embodiment of a pad 400A. The pad 400A is constructed similar to the pad 400 shown in FIGS. 7A-7B, except as noted below. Thus, the reference numerals used to designate the various features of the pad 400A are identical to those used for identifying the corresponding features of the pad 400 in FIGS. 7A7B, except that an "A" has been added to the reference numerals. Further, the description of the features of the pad 400 also apply to the corresponding features of the pad 400A, except as noted below.

The pad 400A differs from the pad 400 in that it has a pair of recesses 430A, 430B on the top surface 420A that extend transverse to each other (e.g., substantially perpendicular to each other). Additionally, a raised surface 422A is defined generally at the center of the top surface 420A of the pad 400A. The raised surface or bump 422A can assist in retaining the elongate body of the marking strip in the recess 430A, 430B of the pad 400A, while still allowing the strip to slide through the recess 430A, 430B (e.g., by pressing the marking strip against the rear surface of the frame or object). Optionally, the marking strip (e.g., the elongate body of the strip) can be creased or grooved so it engages the raised surface 422A, thereby creating a slight resistance to aid in keeping the marking strip in place in relation to the pad while the marking strip is operatively coupled to the frame or object to be hung. Optionally, the pad 400A can be attached to the rear surface of the frame or object so that the top surface 420A faces away from the rear surface of the frame or object. Alternatively, the pad 400A can be attached to the rear surface of the frame or object so that the top surface 420A faces toward the rear surface of the frame or object.

Figure 9B:
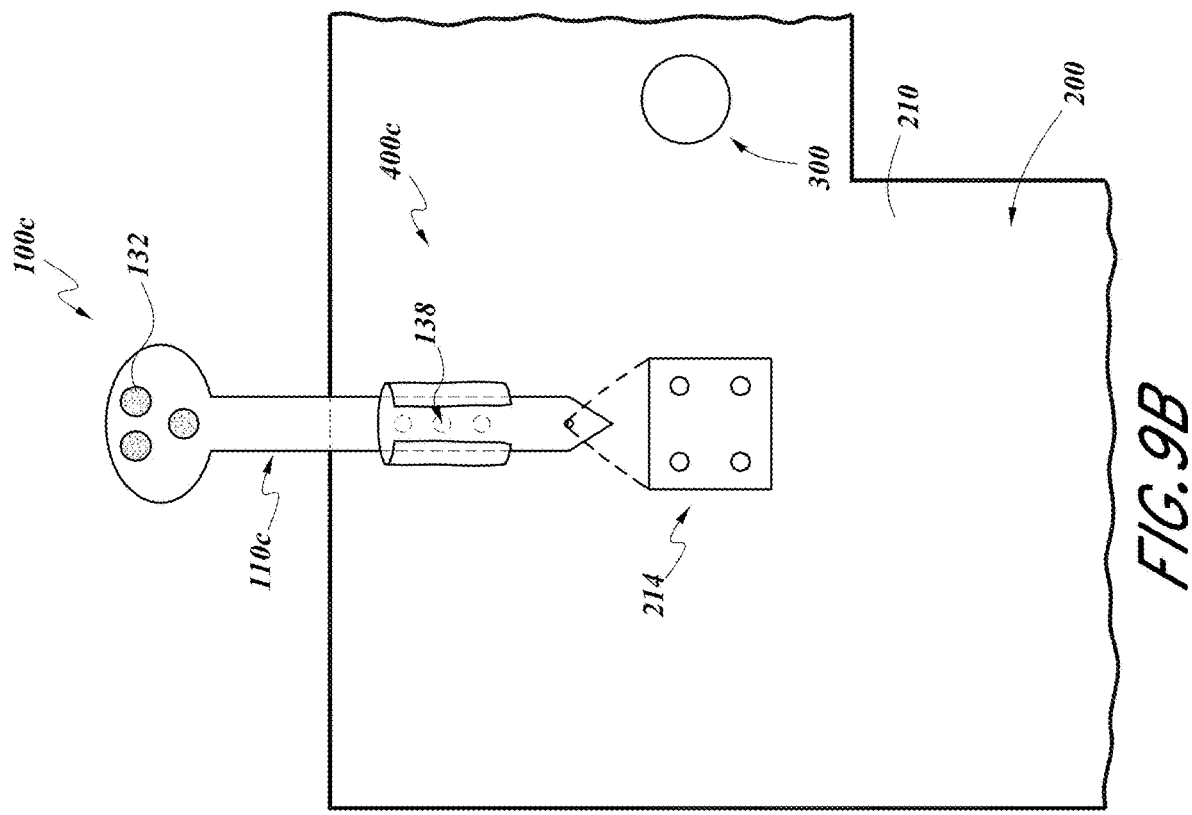
FIG. 9A-9B shows a schematic view of a pair of marking strips attached to a rear portion of a frame.
Figure 9A:
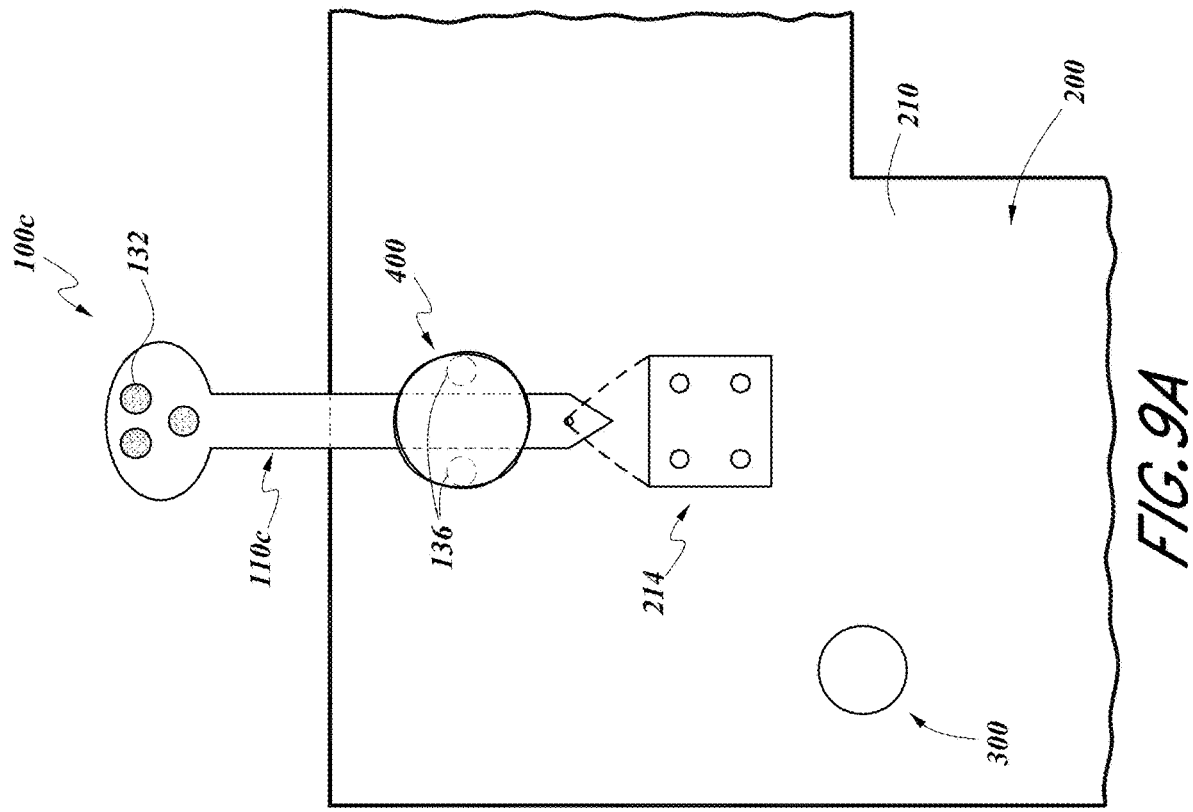

FIG. 9A shows a portion of the frame 200 (similar to the frame 200 in FIG. 3) with a pair of marking strips 100C operatively coupled to the frame 200 (e.g., to the rear surface 210 of the frame 200). A pad 400 is attached to the rear surface 210 of the frame 200 so that the recess 430 extends along an axis that aligns with the top of the hook 216. Optionally, the pad 400 is attached to the rear surface 210 with adhesive 136, similar to adhesive 130, 132, 134 described above (e.g., glue dots, etc.). One or more (e.g. a pair) of tabs or spacers 300 are attached to the rear surface 210 of the frame 200.

The elongate body 110C of the marking strip 100C can extend through the recess 430 so that the optional fastener locator 114C is substantially aligned with the top of the hook 216, as previously described. As previously discussed, the width of the recess 430 is optionally substantially equal to the width of the elongate body 110C (e.g., slightly narrower than the width of the elongate body 110C) to retain the elongate body 110C in place until pulled. In use, once the proximal portion 120C is pressed against the wall surface and the frame 200 is withdrawn (e.g. lowered, etc.), the elongate body 110C can slide out of the recess 430. Optionally, the tabs or spacers 300 have a thickness greater than a combined thickness of the pad 400 and marking strip 100C to inhibit movement of the pad 400 or marking strip 100C while moving the frame 200 on the wall surface while determining the desired location (e.g., elevation, orientation) of the frame 200, to thereby inhibit errors in the location identified by the marking strips for the insertion of fasteners on the wall to hang the frame 200.

FIG. 9B shows a marking strip 100C operatively attached to the rear surface 210 of the frame 200 via a clip 400C that has a track through which the elongate body 110C extends, where the track holds the strip in a substantially fixed orientation until pulled (e.g. when the frame 200 is withdrawn from the wall after the proximal portion 120C of the marking strip 100C has been pressed to the wall). Adhesive 138, similar to adhesive 130, 132, 134 described above, can be used to secure the elongate body 110C to the clip 400C. Optionally, the tabs or spacers 300 have a thickness greater than a combined thickness of the clip 400C and marking strip 100C to inhibit movement of the clip 400C or marking strip 100C while moving the frame 200 on the wall surface while determining the desired location (e.g., elevation, orientation) of the frame 200, to thereby inhibit errors in the location identified by the marking strips for the insertion of fasteners on the wall to hang the frame 200.

FIGS. 10A-10B show another embodiment of a marking strip 100J. The marking strip 100J is constructed similar to the marking strip 100C shown in FIG. 1C, except as noted below. Thus, the reference numerals used to designate the various features of the marking strip 100J are identical to those used for identifying the corresponding features of the marking strip 100C in FIG. 1C, except that a "J" has been added to the reference numerals instead of an "C". Further, the description of the features of the marking strip 100C also apply to the corresponding features of the marking strip 100J, except as noted below.

The marking strip 100J differs from the marking strip 100C in that the proximal portion 120J is detachable from the elongate body 110J. The proximal portion 100J optionally has a pocket or sleeve 126J that removably receives the proximal end 112J of the elongate body 110J. Additionally, the distal end 113J of the elongate body 110J optionally includes a hook 118J. Optionally, the distal end 113J has the fastener locator (e.g., hole, aperture, etc.) 114J. Optionally, the proximal portion 120J and/or proximal end 112J of the elongate body 110J can have a releasably locking member (e.g., pin-hole, adhesive such as low-tack adhesive, magnet, VELCRO®, press fit connection) that allows the proximal portion 120J to substantially remain attached to the proximal end 112J until the elongate body 110J is pulled away from the proximal portion 120J. The hook 118J can allow the marking strip 100J to engage (e.g., catch or capture) the hook 216 or recess 216' of the frame 200, 200'.

FIGS. 11A-11B shows a portion of the frame 200 (similar to the frame 200 in FIG. 3) with the marking strip 100J attached to the rear surface 210 of the frame 200. FIG. 11A shows the proximal portion 120J attached to the elongate body 110J. Similar to the assembly described above for FIG. 3, the elongate body 110J is optionally attached to the rear surface 210 with adhesive 134, an adhesive 132 is also optionally provided on the proximal portion 120J, and the distal end 113J of the elongate body 110J is substantially aligned with the top of the hook 216 of the frame 200 so that the hook 118J engages the hook 216. Alternatively, where the marking strip 100J is attached to a frame similar to the frame 200' in FIG. 2B, the elongate body 110J is attached to the rear surface 210' of the frame 200', optionally with adhesive 134, so that the hook 118J engages the recess or cavity 216'. The frame 200 can have one or more tabs or spacers 300, as discussed previously, to provide clearance for the marking strip 100J attached to the rear surface 210 (e.g., to inhibit movement or dislodgement of the marking strip 100J while moving the frame 200 to identify the desired location for mounting of the frame 200).

FIG. 11B shows the assembly of FIG. 11A once the frame 200 is withdrawn (e.g., lowered relative to the proximal portion 120J) following pressing of the proximal portion 120J to the wall surface to attach (e.g. adhere with adhesive 132) the proximal portion 120J to the wall surface. The proximal portion 120J remains attached to the wall surface once the frame 200 is withdrawn. The user can then detach the elongate body 110J from the rear surface 210 and reattach it to the proximal portion 120J (e.g., so the proximal end 112J of the elongate portion 110J attaches to the pocket/sleeve 126J of the proximal portion 120J) to identify the location where the fasteners should be inserted into the wall surface to thereafter hang the frame 200 in the desired location (e.g., elevation, orientation) on the wall. The location where the fasteners are to be inserted is defined by the location of the hooks 118J (and/or fastener locator 114J) when reattached to the proximal portion 120J.

FIG. 12A shows another embodiment of a marking strip 100K. The marking strip 100K is constructed similar to the marking strip 100C shown in FIG. 1C, except as noted below. Thus, the reference numerals used to designate the various features of the marking strip 100K are identical to those used for identifying the corresponding features of the marking strip 100C in FIG. 1C, except that a "K" has been added to the reference numerals instead of an "C". Further, the description of the features of the marking strip 100C also apply to the corresponding features of the marking strip 100K, except as noted below.

The marking strip 100K differs from the marking strip 100C in that the proximal portion 120K is defined by two areas 120K1, 120K2 to provide greater surface area than proximal portion 120C in marking strip 100C, thereby allowing the proximal portion 120K to have greater surface area for contacting the wall surface (e.g., via an adhesive).

Optionally, the marking strip 100K also have a strain relief section 116K (e.g., a section of reduced width) between the proximal portion 120K and the elongate body 110K, which can advantageously allow movement between the proximal portion 120K and the elongate body 110K. The proximal areas 120K1, 120K2 optionally have generally circular shapes but can have other suitable shapes (e.g., square, rectangular, oval, polygonal, etc.). The size of the proximal areas 120K1, 120K2 can optionally differ. Further the shape of one of the proximal areas 120K1 can optionally differ from the shape of another of the proximal areas 120K2. Though FIG. 12A shows two proximal areas 120K1, 120K2, the marking strip 100K can optionally have more than two such portions.

FIG. 12B shows another embodiment of a marking strip 100L. The marking strip 100L is constructed similar to the marking strip 100K shown in FIG. 12A, except as noted below. Thus, the reference numerals used to designate the various features of the marking strip 100L are identical to those used for identifying the corresponding features of the marking strip 100K in FIG. 12A, except that an "L" has been added to the reference numerals instead of the "K". Further, the description of the features of the marking strip 100K also apply to the corresponding features of the marking strip 100L, except as noted below. The marking strip 100L differs from the marking strip 100K in the shape of the proximal portion 120L, and in that the strain relief section is excluded.

FIG. 12C shows another embodiment of a marking strip 100M. The marking strip 100M is constructed similar to the marking strip 100L shown in FIG. 12B, except as noted below. Thus, the reference numerals used to designate the various features of the marking strip 100M are identical to those used for identifying the corresponding features of the marking strip 100L in FIG. 12B, except that an "M" has been added to the reference numerals instead of the "L". Further, the description of the features of the marking strip 100L also apply to the corresponding features of the marking strip 100M, except as noted below. The marking strip 100M differs from the marking strip 100L in the shape of the proximal portion 120M. In particular, the proximal area 120M2 has a different profile (e.g., with a larger surface area) than the proximal area 120M1.

FIG. 12D shows another embodiment of a marking strip 100N. The marking strip 100N is constructed similar to the marking strip 100A shown in FIG. 1A, except as noted below. Thus, the reference numerals used to designate the various features of the marking strip 100N are identical to those used for identifying the corresponding features of the marking strip 100A in FIG. 1A, except that an "N" has been added to the reference numerals instead of the "A". Further, the description of the features of the marking strip 100A also apply to the corresponding features of the marking strip 100N, except as noted below. The marking strip 100N differs from the marking strip 100A in that the proximal portion 120N is not at the proximal end 112N of the elongate body 110N, but is instead located between the proximal end 112N and the distal end 113N of the elongate body 110N. The proximal portion 110N has a generally rectangular shape, but can have other suitable shapes (e.g., round, oval, square, polygonal, etc.).

FIG. 12E shows another embodiment of a marking strip 100P. The marking strip 100P is constructed similar to the marking strip 100A shown in FIG. 1A, except as noted below. Thus, the reference numerals used to designate the various features of the marking strip 100P are identical to those used for identifying the corresponding features of the marking strip 100A in FIG. 1A, except that a "P" has been added to the reference numerals instead of the "A". Further, the description of the features of the marking strip 100A also apply to the corresponding features of the marking strip 100P, except as noted below.

The marking strip 100P differs from the marking strip 100A in that the proximal portion is excluded so that the marking strip 100P is solely defined by an elongate body 110P. Also, the elongate body 110P has a generally rectangular shape with a linear distal edge and linear proximal edge.

FIGS. 13A-13B shows another pad 400D that can be used with a marking strip, such as marking strip 100K, in facilitating the hanging of a frame or object. The pad 400D is constructed similar to the pad 400 shown in FIG. 7A, except as noted below. Thus the reference numerals used to designate the various features of the pad 400D are identical to those used for identifying the corresponding features of the pad 400 in FIG. 7A, except that a "D" has been added to the reference numerals. Further, the description of the features of the pad 400 also apply to the corresponding features of the pad 400D, except as noted below.

The pad 400D differs from the pad 400 in that instead of the recess 430 that defines an open channel in the pad 400, the pad 400D has openings on different faces of the pad 400D that allow for insertion of the marking strip 100K in different orientations through the pad 400D, making the pad 400D multiplanar. Specifically, the pad 400D has an opening 430D1 on a substantially planar upper surface 406D, an opening 430D2 on an end surface 404D and an opening (not shown) on an opposite end surface 402D. Therefore, the pad 400D has openings on three faces of the pad 400D. The pad 400D has a side surface 408D that shares an edge with the end surfaces 402D, 404D and top surface 406D. Optionally, the pad 400D defines a hollow space or cavity under the top surface 406D in communication with the openings 430D1, 430D2. Alternatively, the pad 400D defines channels that extend between the openings 430D1, 430D2. As with the pad 400, the pad 400D can be attached to a rear surface (e.g., rear surface 210) of a frame (e.g., frame 200) or object to be hung (e.g., with an adhesive, hoop and loop fasteners, magnet, etc.). Advantageously, the pad 400D allows insertion of the marking strip 100L therethrough in a variety of orientations, making the pad 400D more versatile.

FIG. 13A shows the marking strip 100K inserted through the opening (not shown) on the end surface 402D and the opening 430D2 on the opposite end surface 404D. The marking strip 100K therefore extends along a plane generally perpendicular to the top surface 406D. FIG. 13B shows the marking strip 100K inserted through the opening 430D1 on the top surface 406D and the opening 430D2 on the end surface 404D of the pad 400D. The marking strip 100K therefore extends along a plane at angle (e.g., acute angle) relative to the top surface 406D.

FIGS. 13C-13E show a pad 400H for use with marking strips, such as marking strips 100A-100P disclosed herein. Pad 400H has a top surface 406H and a bottom surface 408H. The pad 400H has a pair of channels or tracks that allow the marking strip to be inserted in two different orientations that are transverse (e.g., perpendicular to each other). One channel is defined between openings 430h2, 430h1 on opposite sides (e.g., front side, rear side) of the pad 400H. The other channel is defined between openings 430h3, 430h4 on opposite sides (e.g., top side, bottom side) of the pad 400H.

In one variation, the pad 400H can be attached (e.g., with adhesive) to a top of a frame (e.g., frame 200, 200') or object so that the bottom surface 408H is against the top surface of the frame or object and the channel or track defined by the openings 430h3, 430h4 extend past the rear surface of the frame or object and align with a hook or cavity/recess (e.g., hook 216 or cavity/recess 216') of the frame or object. The marking strip (e.g., marking strip 100A-10OP) can be inserted through the openings 430h3, 430h4 so that the distal end of the marking strip aligns with the hook or cavity/recess of the frame or object, as discussed in other embodiments. As with other embodiments described herein, the marking strip can then be pressed against the wall surface once the desired orientation of the frame or object is determined, and the frame or object withdrawn from the wall to leave the marking strip attached to the wall. The distal end of the marking strip identifies the location for inserting a fastener (e.g., nail) to thereafter hang the frame or object at the desired location.

In another variation, the pad 400H can be attached (e.g., with adhesive) to a rear surface of a frame (e.g., frame 200, 200') or object so that the bottom surface 408H is against the rear surface of the frame or object and the channel or track defined by the openings 430h1, 430h2 align with a hook or cavity/recess (e.g., hook 216 or cavity/recess 216') of the frame or object. The marking strip (e.g., marking strip 100A-10OP) can be inserted through the openings 430h1, 430h2 so that the distal end of the marking strip aligns with the hook or cavity/recess of the frame or object, as discussed in other embodiments. As with other embodiments described herein, the marking strip can then be pressed against the wall surface once the desired orientation of the frame or object is determined, and the frame or object withdrawn from the wall to leave the marking strip attached to the wall. The distal end of the marking strip identifies the location for inserting a fastener (e.g., nail) to thereafter hang the frame or object at the desired location. Optionally, one or more tabs or spacers 300 can also be attached to the rear surface of the frame or object to be hung, as described in connection with other embodiments. As in other embodiments, a pad 400H can be attached to the frame or object to be hung for each of the hooks (e.g., hooks 216) or cavities/recesses (e.g., cavity 216') that the frame or object has.

Figure 14:
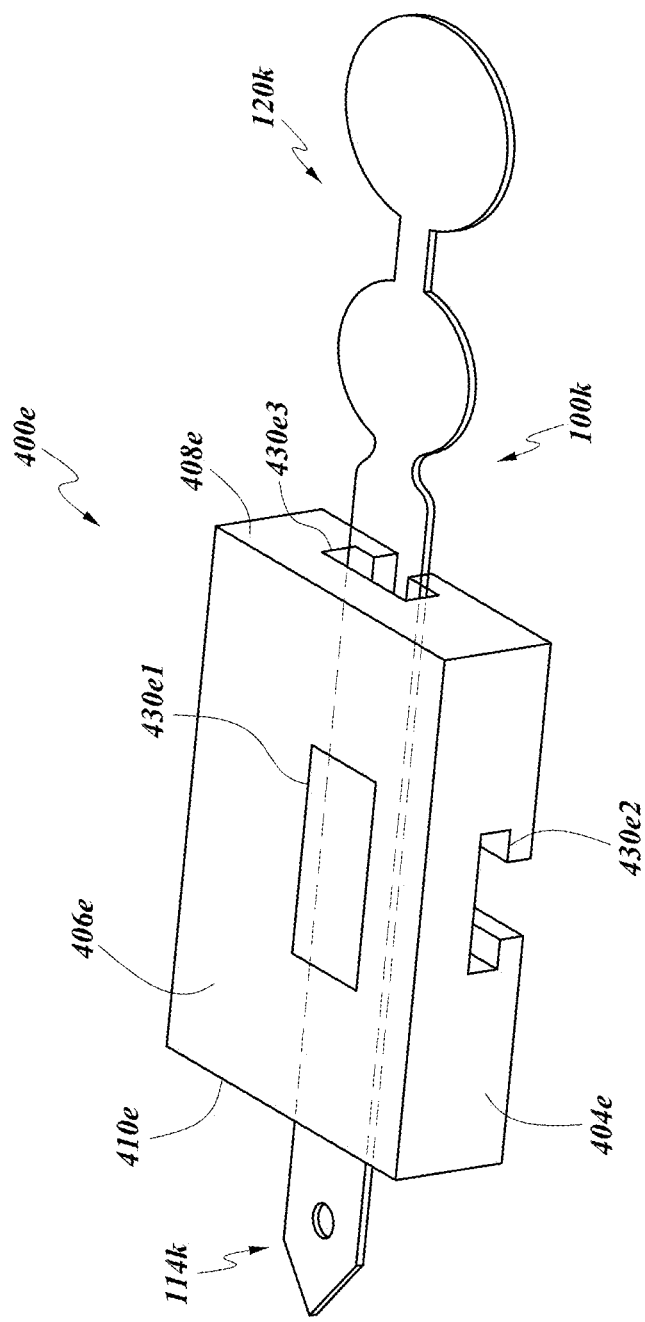
FIG. 14 shows a schematic view of a marking strip extending through a pad in one orientation.

FIG. 14 shows a pad 400E that is similar to the pad 400D in FIG. 13A-B, except as noted below. Thus the reference numerals used to designate the various features of the pad 400E are identical to those used for identifying the corresponding features of the pad 400D in FIGS. 13A-13B, except that an "E" has been added to the reference numerals instead of a "D". Further, the description of the features of the pad 400D also apply to the corresponding features of the pad 400E, except as noted below.

The pad 400E differs from the pad 400D in that the pad 400E has openings on four faces of the pad 400E. Specifically, the pad 400E has opening 430E1 on a substantially planar top face 406E, an opening 430E2 on a side surface 404E, an opening 430E3 on an end surface 408E and an opening (not shown) on an opposite end surface 410E. As shown in FIG. 14, a marking strip 100K extends through the opening 430E3 and the opening on the opposite end surface 410E, such that the marking strip 100K extends along a plane generally parallel to the top surface 406E. However, the marking strip 100K can be inserted in other orientations through the pad 400E, such as through openings 430E1, 430E2. The pad 400E can be attached to a frame (such as frame 200) or object to be hung in a similar manner as pad 400 (e.g., using an adhesive, such as adhesive 130, magnets, VELCRO®, etc.).

Though FIGS. 13A-14 shows the use of marking strip 100K, any of the marking strips disclosed herein (e.g., marking strips 100A-P) can be used with the pad 400D, 400E.

Figure 15:
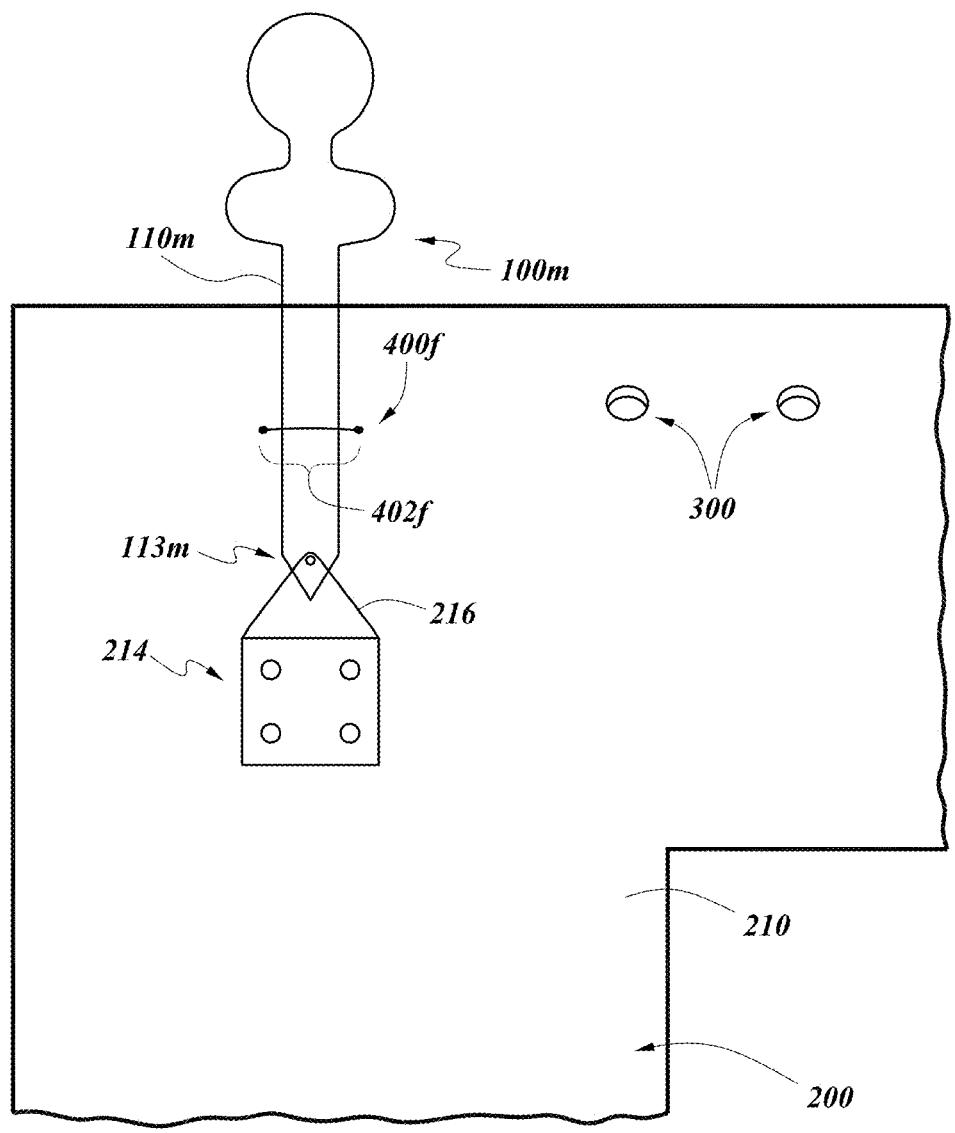
FIG. 15 shows a schematic view of a marking strip attached to a rear portion of a frame.

FIG. 15 shows a marking strip 100M attached to a rear surface 210 of the frame 200. As with the frame 200 in FIG. 2A, the frame 200 in FIG. 15 has a hook 216 attached to a bracket 214 on the rear surface 210 of the frame and one or more (e.g., a pair) of tabs or spaces 300 on the rear surface 210. The frame 200 has a band 400F attached to the rear surface 210 that defines an opening 402F through which the elongate body 110M can pass so that the distal end 113M of the elongate body 110M aligns with the top of the hook 216. The band 400F can be made of plastic, paper, metal. Optionally, the band 400F can be a staple that has a gap 402F through which the elongate body 110M can extend. In another variation, the band 400F can be a wire or cable affixed to the rear surface 210 (e.g. with nails, pins, etc.) that defines a gap between the rear surface 210 and the wire. Optionally, the tab or spacer 300 has a height or thickness greater than the combined thickness of the band 400F and marking strip 100M to inhibit movement or dislodgement of the marking strip 100M while the frame 200 is moved while determining the desired location (e.g., elevation, orientation) for the frame 200.

Figure 16:
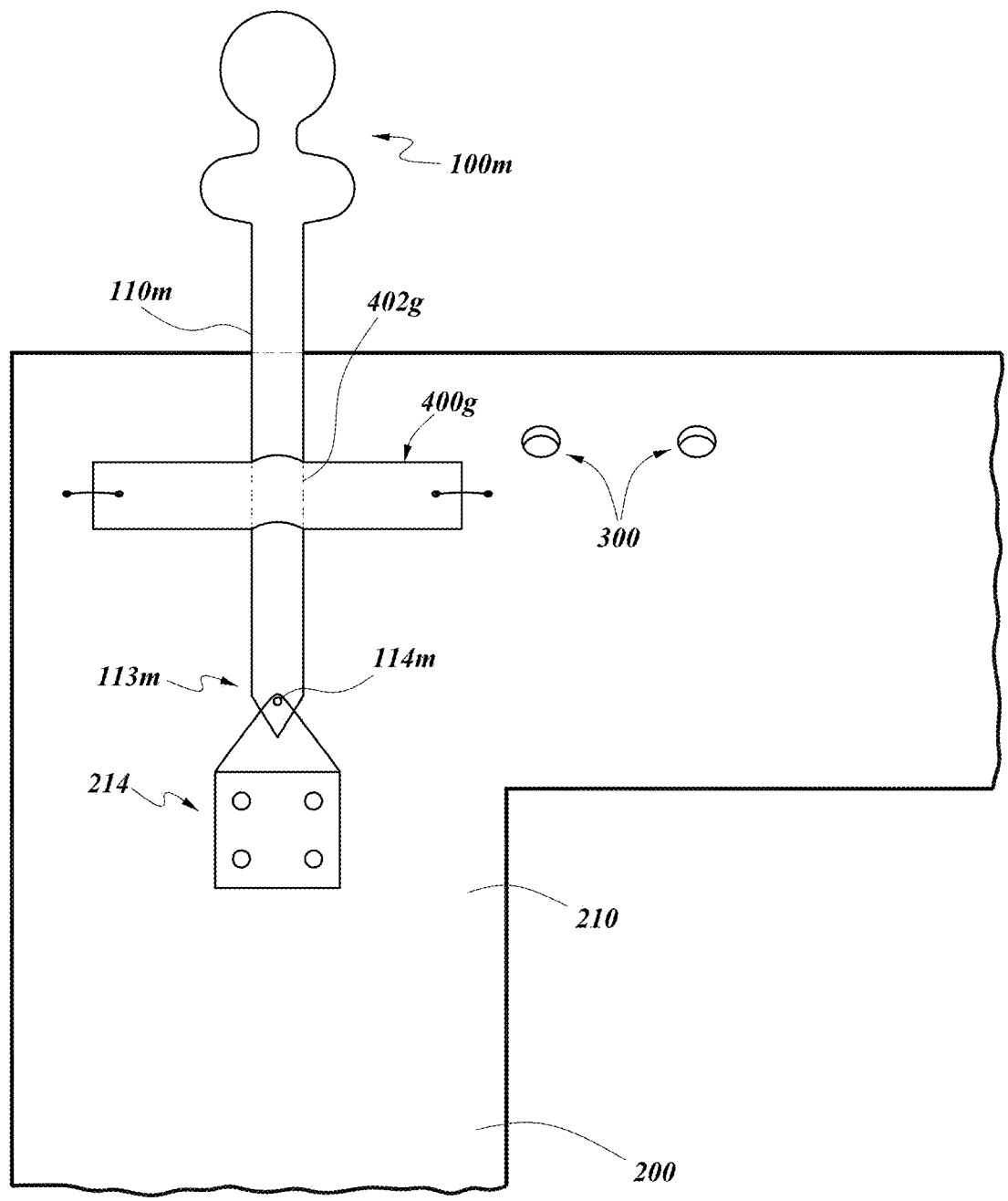
FIG. 16 shows a schematic view of a marking strip attached to a rear portion of a frame.

FIG. 16 shows the marking strip 100M attached to a rear surface 210 of the frame 200. As with the frame 200 in FIG. 15, the frame 200 in FIG. 16 has a hook 216 attached to a bracket 214 on the rear surface 210 of the frame and one or more (e.g., a pair) of tabs or spaces 300 on the rear surface 210. The frame 200 has a band 400G attached to the rear surface 210 that defines an opening 402G through which the elongate body 110M can pass so that the distal end 113M of the elongate body 110M (e.g., the fastener locator 114M at the distal end 113M of the elongate body 110M) aligns with the top of the hook 216. The band 400G can optionally be made of plastic, paper, metal. In the illustrated embodiment, the opening 402G is a channel defined between the band 400G and the rear surface 210 of the frame 200. The band 400G is optionally attached to the rear surface 210 with fasteners, such as nails, pins, staples, etc.

Figure 17:
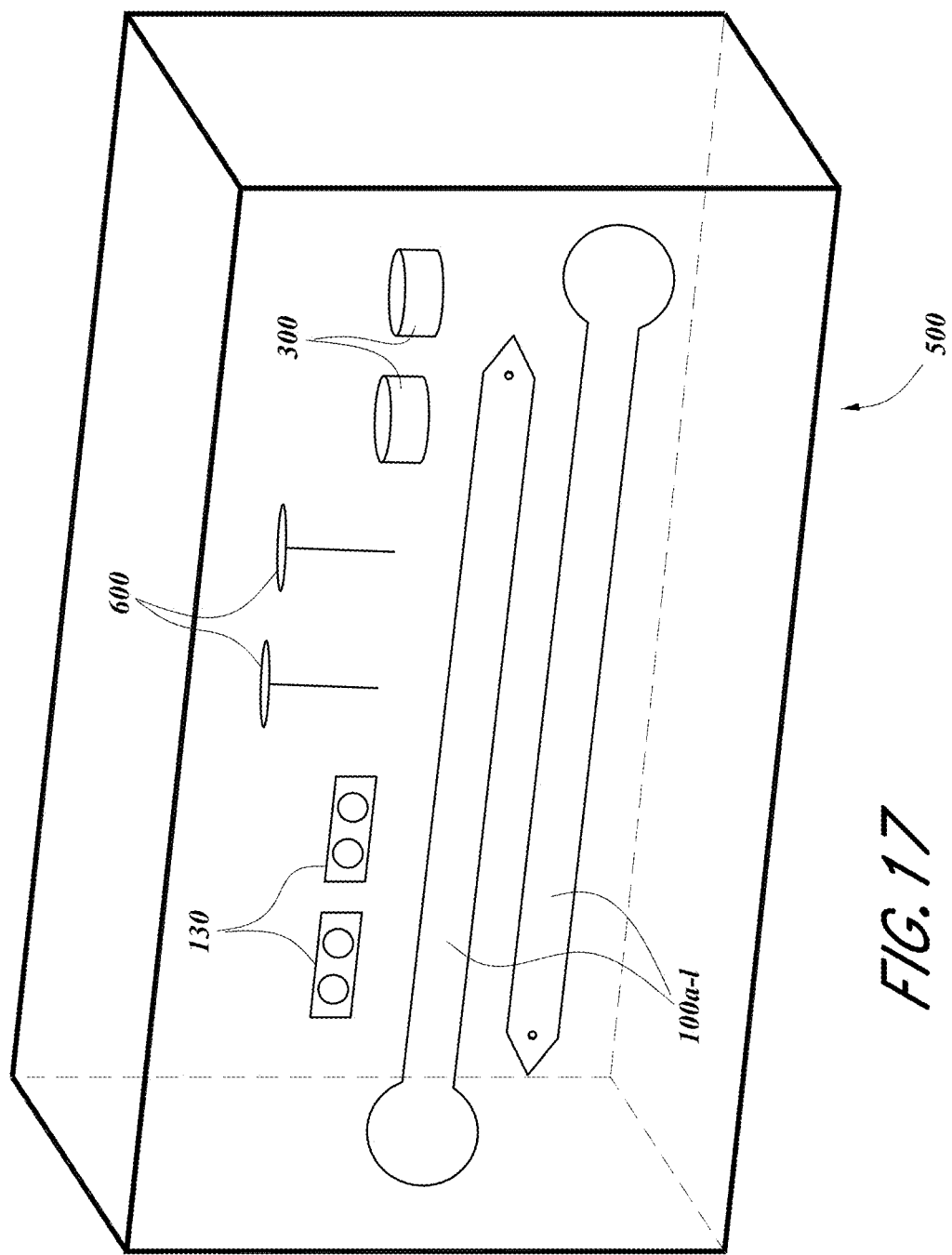
FIG. 17 shows a kit for use in hanging frames or objects on a wall.

FIG. 17 shows a kit 500 for use in hanging frames (such as frame 200, 200') or other objects, and in particular for facilitating the identification of the location where fasteners are to be inserted in a wall to hang the frame or object in a predetermined location (e.g., elevation, orientation). The kit 500 can include one or more marking strips 100A-P, one or more tabs or spacers 300, one or more fasteners 600 (e.g., nails, pins), one or more adhesives 130 (e.g., glue dots, double-sided adhesive, pressure sensitive adhesive, etc.). The marking strips 100A-P can optionally be pre-cut to different lengths, and may optionally have adhesive 130 already applied thereon, so the user can readily apply the marking strip 100A-P to the object to be hung (e.g., by removing a cover/backing from the adhesive to expose the adhesive and then press the adhesive to a rear surface of the object to be hung).

With any of the variations described above, the marking strip 100A-P and pad 400, 400D, 400E, 400F, 400G can be utilized with any hook type on a frame or object to be hung, including standard hooks, saw tooth hooks, keyholes, tracks, rails, bar hangers, hanging cables, and adjustable hooks. Additionally, as discussed above, the object to be hung is not limited to picture frames, but can be other objects (e.g., mirrors, wall mount televisions, wall mount television brackets, wall decorations, etc.).

With respect to the variations of the pad 400, 400D, 400E, 400F, 400G describe above, the pad can provide an amount of friction with the marking strip 100A-P in different manners. For example, the pad can apply a spring load on a surface (top, bottom, side edges, etc.) of the marking strip. In another variation, the pad can have grooves, channels, lines or a rough surface that can engage a surface or edge of the marking strip to substantially retain the marking strip in place until pulled or pushed. In another variation, the pad can include a mechanism (e.g., release button) that if actuated releases the marking strip 100A-P without having to pull on the object relative to the marking strip 100A-P.

Method of Operation

As discussed above, in one implementation one or more marking strips 100A-P are removably attached to a surface of an object to be hung on a wall surface (e.g., a frame, such as a picture frame 200, 200' or painting, decoration, knick knack, wall mountable television bracket, wall mountable television, shelving bracket, etc.). For example, the user can take one or more marking strips 100A-P, such as provided in the kit 500, and removably affix them to a rear surface of the object to be hung (e.g., rear surface 210, 210' of the frame 200, 200'), such as with an adhesive (e.g., adhesive 130, such as glue dots, double sided adhesive, etc.). Optionally, the user can first affix one or more pads 400-400E or band 400F-400G to the rear surface of the object to be hung (e.g., the rear surface 210, 210' of the frame 200, 200'), in the manner described above, and then removably couple the marking strips 100A-P to the pads 400-400E or bands 400F-400G.

The user can affix the marking strips 100A-P so that the distal end 113A-P of the marking strips 100A-P (e.g., the fastener locator 114C-P of the distal end 113A-P of the marking strips 100A-P) are substantially aligned with a hook 216, recess 216' or other connector of the frame 200, 200' or object to be hung.

The marking-strips 100A-P can optionally be removably attached to the rear surface of the frame 200, 200' or object to be hung so that the proximal portion 120A-P of the marking strips 100A-P protrude above a top edge of the frame or object to be hung. Optionally, the user can also apply one or more tabs or spacers 300 (e.g., from the kit 500) to the rear surface of the frame 200, 200' or object to be hung. The user can then position the frame 200, 200' or object to be hung against the wall surface and reposition it as needed to determine the desired location (e.g., elevation, orientation) for the frame 200, 200' or object to be hung. Once the desired location has been determined by the user, the proximal portion 120A-P of the one or more marking strips 100A-P can be pressed against the wall surface to attach them (e.g., adhere them) to the wall surface and the frame 200, 200' or object to be hung can be withdrawn (e.g., lowered) relative to the proximal portion 120A-P to detach the frame 200, 200' from at least the proximal portion 120A-P of the marking strip 100A-P. Optionally, where the elongate body 110A-P is detachable from the proximal portion 120A-P, the elongate body 110A-P can be detached from the withdrawn frame or object and reattached to the proximal portion 120A-P attached to the wall surface. The distal end 113A-P of the elongate body 110A-P (e.g., the fastener locator 114C-P) identifies where the fasteners (e.g. nail, pin, etc.) is to be inserted. The user can then insert the fasteners as said locations and remove the marking strips 100A-P. Optionally, the tabs or spacers 300 can be removed from the rear surface 210, 210' of the frame 200, 200' or object prior to hanging it. Optionally, the pads 400-400E or bands 400F-400G, if used, can be removed from the rear surface 210, 210' of the frame 200, 200' or object prior to hanging it. The frame 200, 200' or object can then be hung at the desired location by coupling the frame 200, 200' or object to said fasteners.

In another variation, the marking-strips 100A-P can optionally be removably attached to the rear surface of the frame 200, 200' or object to be hung so that the proximal portion 120A-P of the marking strips 100A-P protrude below a bottom edge of the frame or object to be hung. The process for locating the desired mounting location and pressing the proximal portion 120A-P can proceed as previously described. The frame 200, 200' or object to be hung can be withdrawn (e.g., raised) relative to the proximal portion 120A-P to detach the frame 200, 200' from at least the proximal portion 120A-P of the marking strip 100A-P.

In still another variation, the marking-strips 100A-P can optionally be removably attached to the rear surface of the frame 200, 200' or object to be hung so that the proximal portion 120A-P of the marking strips 100A-P protrude from a side edge of the frame or object to be hung. The process for locating the desired mounting location and pressing the proximal portion 120A-P can proceed as previously described. The frame 200, 200' or object to be hung can be withdrawn (e.g., moved laterally in a direction away from the proximal portion 120A-P) relative to the proximal portion 120A-P to detach the frame 200, 200' from at least the proximal portion 120A-P of the marking strip 100A-P.

In one variation, the marking strips 100A-P, adhesive 130, tabs or spacers 300 and pads 400-400E or band 400F-400G can be provided in a kit, such as the kit 500, and the user can then apply them to the frame 200, 200' or object to be hung. In another variation, the frame 200, 200' or object can have the marking strips 100A-P, optional tabs or spacers 300 and/or optional pads 400-400E or bands 400F-400G already attached thereto. For example, a user can purchase the frame 200, 200' or object with the marking strips 100A-P already attached.

While certain embodiments of the inventions have been described, these embodiments have been presented by way of example only and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the charger need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed charger.

What is claimed is:

1. A system for hanging an object at a desired location on a wall without taking measurements, the object having one or more hooks, recesses or openings on a mounting surface thereof, the system comprising:
    one or more marking strips removably attachable to the mounting surface of the object, each of said one or more more marking strips being substantially planar along its entire length and comprising:
    an elongate body that extends linearly from a proximal end to a distal end and includes an attachment mechanism configured for removably attaching the elongate body to the mounting surface of the object;
    a proximal head attached to the proximal end of the elongate body; and
    one or more adhesive portions disposed on a surface of the proximal head that faces away from the object the one or more marking strips are attached to the object via the attachment mechanism;
    wherein the one or more marking strips are configured to removably attach to a real surface of the object so that the distal end of the elongate body aligns with a mounting hook, recess or opening on the mounting surface of the object and so that the proximal head protrudes from an edge of the object, and wherein a proximal portion is configured to adhere to a wall surface when pressed thereto once the desired location for hanging the object is determined, such that when the mounting surface of the object is pulled away from the one or more marking strips after the proximal portion adheres to the wall, an entirety of the one or more marking strips are detached from the mounting surface of the object and remains attached to the wall surface, with the distal end of the elongate body indicating a location for insertion of a fastener to mount the object in the desired location,
    wherein the elongate body includes a plurality of joints allowing one portion of the elongate body to pivot relative to another portion of the elongate body to vary a length of the elongate body.

2. The system of claim 1, wherein the proximal head has a width greater than a width of the elongate body.

3. The system of claim 1, wherein the proximal head comprises a level attached to a surface of the proximal head that faces toward the object when the marking strip is attached to the object.

4. The system of claim 1, wherein the elongate body includes a plurality of markings between the proximal end and the distal end of the elongate body.

5. The system of claim 1, wherein the elongate body includes a portion that telescopingly extends relative to another portion of the elongate body to vary a length of the elongate body.

6. The system of claim 1, wherein the distal end of the elongate body defines a fastener locator that indicates the location for insertion of the fastener to mount the object in the desired location.

7. The system of claim 1, further comprising one or more spacers removably coupleable to the rear surface of the object, the one or more spacers having a thickness greater than a thickness of the one or more marking strips to allow repositioning of the object while in contact with the wall without altering a position of the one or more marking strips relative to the object.

8. The system of claim 1, further comprising a pad removably attachable to a top surface or the rear surface of the object, the pad having one or more channels configured to at least partially receive the elongate body therethrough and to substantially retain the elongate body in a fixed position until the elongate body is pulled relative to the pad.

9. The system of claim 8, wherein the one or more channels are defined between one or more openings on a surface of the pad.

10. The system of claim 1, wherein the distal end of the elongate body further comprises a hook configured to releasably engage the mounting hook, recess or opening on the rear surface of the object.

11. A system for hanging an object at a desired location on a wall without taking measurements, the object having one or more hooks, recesses or openings on a mounting surface thereof, the system comprising:
    one or more marking strips removably attachable to the mounting surface of the object, each of said one or more marking strips being substantially planar along its entire length and comprising:
    an elongate body that extends linearly from a proximal end to a distal end and includes an attachment mechanism configured for removably attaching the elongate body to the mounting surface of the object;
    a proximal head attached to the proximal end of the elongate body, and
    one or more adhesive portions disposed on a surface of the proximal head that faces away from the object when the one or more marking strips are attached to the object via the attachment mechanism;
    wherein the one or more marking strips are configured to removably attach to a rear surface of the object so that the distal end of the elongate body aligns with a mounting hook, recess or opening on the mounting surface of the object and so that the proximal head protrudes from an edge of the object, and wherein a proximal portion is configured to adhere to a wall surface when pressed thereto once the desired location for hanging the object is determined, such that when the mounting surface of the object is pulled away from the one or more marking strips after the proximal portion adheres to the wall, and entirety of the one or more marking strips are detached from the mounting surface of the object and remains attached to the wall surface, with the distal end of the elongate body indicating a location for insertion of a fastener to mount the object in the desired location, a pad removably attachable to a top surface or the rear surface of the object, the pad having one of more channels configured to at least partially receive the elongate body therethrough and to substantially retain the elongate body in a fixed position until the elongate body is pulled relative to the pad, wherein the one or more channels are defined between one or more openings on a surface of the pad;

wherein the one or more openings include one of the following:

a pair of openings on a front side and opposite rear side of the pad, allowing the one or more marking strips to be inserted through the pad in an orientation substantially parallel to a top surface of the pad, or the pair of opening on the front side and a top side generally perpendicular to the front side, allowing the one or more marking strips to be inserted through the pad in an orientation at an acute angle relative the one or more marking strips are of the pad.

12. A kit for hanging an object at a desired location on a wall without taking measurements, the object having one or more hooks, recesses or openings on a mounting surface thereof, the kit comprising:

a plurality of substantially planar marking strips, each having an elongate body that extends linearly from a proximal end to a distal end and includes an attachment mechanism configured for removably attaching the elongate body to the mounting surface of the object, a proximal head attached to the proximal end of the elongate body, and one or more adhesive portions disposed on a surface of the proximal head that faces away from the object when the plurality of substantially planer marking strips are attached to the object via the attachment mechanism, the elongate body being removably attachable to a mounting surface of the object so that the distal end of the elongate body aligns with a mounting hook, recess or opening on the mounting surface of the object and so that the proximal head protrudes from an edge of the object, and wherein a proximal portion of each of the plurality of subsrtantially planar marking strips is configured to adhere to a wall surface when pressed thereto once the desired location for hanging the object is determined, such that when the mounting surface of the object is pulled away from the plurality of substantially planer marking strips after the proximal portion adheres to the wall, an entirety of the plurality of substantially planer marking strips are is detached from the mounting surface of the object and remains attached to the wall surface, with the distal end of the elongate body indicating a location for insertion of a fastener to mount the object in the desired location;

a plurality of spacers, each spacer removably coupleable to the mounting surface of the object, the plurality of spacers having a thickness greater than a thickness of the plurality of substantially planer marking strips to allow repositioning of the object while in contact with the wall without altering a position of the plurality of substantially planer marking strips relative to the object; and a plurality of adhesive portions attachable to one or both of the elongate body and proximal head plurality of substantially planer marking strips to attach the plurality of substantially planer marking strips to the mounting surface of the object or attach the proximal head to the wall surface.

13. The kit of claim 12, further comprising a plurality of pads, each pad being removably attachable to a top surface or the rear surface of the object, the pad having one or more channels configured to at least partially receive the elongate body therethrough and to substantially retain the elongate body in a fixed position until the elongate body is pulled relative to the pad.

14. The kit of claim 13, wherein the one or more channels are defined between one or more openings on a surface of the pad;

wherein the one or more openings include a pair of openings on a front side and a top side generally perpendicular to the front side, allowing the plurality of substantially planer marking strips to be inserted through the pad in an orientation at an acute angle relative to a top surface of the pad.

* * * * *